United States Patent
Song et al.

(10) Patent No.: US 11,285,694 B1
(45) Date of Patent: Mar. 29, 2022

(54) COMPOSITE DECORATIVE BOARD AND MANUFACTURING METHOD THEREOF

(71) Applicant: ZHEJIANG YONGYU FURNITURE CO., LTD., Zhejiang (CN)

(72) Inventors: Jiangang Song, Huzhou (CN); Jinsong Wang, Huzhou (CN); Jiajin Fu, Huzhou (CN); Peng Yan, Huzhou (CN)

(73) Assignee: ZHEJIANG YONGYU FURNITURE CO., LTD., Huzhou (CN)

( * ) Notice: Subject to any disclaimer, the term of this patent is extended or adjusted under 35 U.S.C. 154(b) by 0 days.

(21) Appl. No.: 17/226,064

(22) Filed: Apr. 8, 2021

(30) Foreign Application Priority Data

Dec. 31, 2020 (CN) .......................... 202011642281.2

(51) Int. Cl.
| | | |
|---|---|---|
| *B32B 7/027* | (2019.01) | |
| *B32B 7/022* | (2019.01) | |
| *B32B 27/30* | (2006.01) | |
| *B32B 27/20* | (2006.01) | |
| *B32B 27/22* | (2006.01) | |

(52) U.S. Cl.
CPC .............. *B32B 7/027* (2019.01); *B32B 7/022* (2019.01); *B32B 27/20* (2013.01); *B32B 27/22* (2013.01); *B32B 27/304* (2013.01); *B32B 2255/10* (2013.01); *B32B 2255/26* (2013.01); *B32B 2307/30* (2013.01); *B32B 2307/51* (2013.01); *B32B 2307/718* (2013.01); *B32B 2307/732* (2013.01); *B32B 2451/00* (2013.01)

(58) Field of Classification Search
None
See application file for complete search history.

(56) References Cited

U.S. PATENT DOCUMENTS

| | | | |
|---|---|---|---|
| 6,384,101 B1 * | 5/2002 | Park ..................... | C09D 175/16 522/71 |
| 9,809,695 B2 * | 11/2017 | Lu ........................ | B32B 27/306 |
| 10,343,379 B2 * | 7/2019 | Lu .......................... | B32B 27/22 |
| 10,458,126 B2 * | 10/2019 | Sato ........................ | C08K 5/12 |
| 10,633,503 B2 * | 4/2020 | Zhou ....................... | B32B 3/28 |
| 2015/0274931 A1 * | 10/2015 | Chen ....................... | B32B 27/22 428/455 |
| 2017/0369760 A1 * | 12/2017 | Pober ..................... | C09K 8/502 |
| 2018/0304601 A1 | 10/2018 | Song et al. | |

FOREIGN PATENT DOCUMENTS

| | | |
|---|---|---|
| CN | 205100481 U | 3/2016 |
| CN | 104589677 B | 3/2018 |
| CN | 109705497 A | 5/2019 |
| CN | 111040422 A | 4/2020 |
| CN | 111441555 A | 7/2020 |
| CN | 211114540 U | 7/2020 |
| CN | 211691280 U | 10/2020 |

* cited by examiner

*Primary Examiner* — Cheng Yuan Huang
(74) *Attorney, Agent, or Firm* — Metis IP LLC

(57) ABSTRACT

The present disclosure provides a composite decorative board having a multi-layer structure. The composite decorative board may include a substrate layer. The substrate layer may include at least one first structural layer and at least one second structural layer. The second structural layer may be disposed on the first structural layer. The first structural layer may be an elastic layer, and a component of the first structural layer may include a plasticizer. The second structural layer may be a rigid layer. Thermal expansion and cold contraction of other layers of the composite decorative board may be effectively matched by setting the elastic layer and the rigid layer on the substrate layer, which may effectively improve a stability, a warpage deformation, and a contraction-expansion of the composite decorative board.

11 Claims, 3 Drawing Sheets

COMPOSITE DECORATIVE BOARD AND MANUFACTURING METHOD THEREOF

CROSS-REFERENCE TO RELATED APPLICATIONS

This application claims priority of Chinese Patent Application No. 202011642281.2, filed on Dec. 31, 2020, the contents of which are hereby incorporated by reference.

TECHNICAL FIELD

The present disclosure relates to decorative board manufacturing, and more specifically, relates to a composite decorative board and a manufacturing method thereof.

BACKGROUND

At present, people usually use ceramic tiles or stone plastic composite boards (e.g., wooden multi-layer boards, high density boards, or inorganic boards) as decoration materials. However, the ceramic tiles have relatively weak impact resistances, and are fragile. Weights of the ceramic tiles are relatively large, which have a greater impact on high-rise buildings. Besides, most stone-plastic boards on the market need to be manufactured in a compound manner using glue and hot-pressing. A high-gloss effect of a surface of the stone-plastic board may be compressed using a mirror steel board. On one hand, the manufacturing efficiency and the production yield of the stone plastic board may be low, and the labor cost may be high; on the other hand, since a decorative surface and a substrate board of the stone plastic board are combined using glue, it is not environmentally friendly and is liable to delaminate, and a structure of the product is unstable.

Therefore, it is necessary to provide a composite decorative board with a high manufacture efficiency, being environmentally friendly, and having no formaldehyde, a lower density than the ceramic tiles, a good temperature resistance, and a good stability.

SUMMARY

One of the embodiments of the present disclosure provides a composite decorative board having a multi-layer structure. The decorative board may include a substrate layer. The substrate layer may include at least one first structural layer and at least one second structural layer. The second structural layer may be disposed on the first structural layer. The first structural layer may be an elastic layer. A component of the first structural layer may include a plasticizer. The second structural layer may be a rigid layer.

In some embodiments, as for 323.45 parts by weight of the first structural layer, the first structural layer may include 10-20 parts by weight of the plasticizer.

In some embodiments, the plasticizer may include epoxy groups.

In some embodiments, the plasticizer may include at least one of epoxy linseed oil or epoxy soybean oil.

In some embodiments, the components of the first structural layer may further include polyvinyl chloride, at least one inorganic filler, at least one lubricant, and at least one stabilizer.

In some embodiments, the components of the first structural layer may further include at least one colorant. The at least one inorganic filler may include calcium carbonate. The at least one lubricant may include polyethylene wax.

In some embodiments, the components of the first structural layer may include 90-100 parts by weight of polyvinyl chloride, 200-250 parts by weight of calcium carbonate, 0.1-0.3 parts by weight of polyethylene wax, 2-4 parts by weight of a stabilizer, 10-20 parts by weight of the plasticizer, and 0.1-0.4 parts by weight of at least one colorant.

In some embodiments, a thickness of the first structural layer may be 1.0-1.5 millimeters.

In some embodiments, the components of the second structural layer may include 90-110 parts by weight of polyvinyl chloride, 300-400 parts by weight of calcium carbonate, 1.0-1.6 parts by weight of polyethylene wax, 5-7 parts by weight of a stabilizer, 1.1-1.7 parts by weight of stearic acid, and 5-7 parts by weight of a forming agent of acrylate resin coordinating a metal ion.

In some embodiments, the components of the second structural layer may include 100 parts by weight of the polyvinyl chloride, 350 parts by weight of the calcium carbonate, 1.3 parts by weight of the polyethylene wax, 6 parts by weight of the stabilizer, 1.4 parts by weight of the stearic acid, and 6 parts by weight of the forming agent of acrylate resin coordination the metal ion.

In some embodiments, the thickness of the second structural layer may be 3.0-6.5 millimeters.

In some embodiments, the composite decorative board may further include an ultraviolet (UV) coating layer disposed on the second structural layer. The UV coating layer may at least include one of a primer coating layer and a surface coating layer.

In some embodiments, the primer coating layer may have a mass per unit area of 10-15 $g/m^2$. The surface coating layer may have a mass per unit area of 60-70 $g/m^2$.

In some embodiments, the components of the primer coating layer may include 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1-3.0 parts by weight of fumed silica.

In some embodiments, the components of the surface coating layer may include 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1-3.0 parts by weight of fumed silica.

One of the embodiments of the present disclosure provides a method for manufacturing a composite decorative board. The method may include forming the substrate layer by extruding raw materials of the first structural layer and the second structural layer through a coextrusion extruder; obtaining a semi-manufactured board by rolling the substrate layer, a printed decorative layer, and a wear-resistant layer through one-step forming; forming a prime coating layer on the semi-manufactured board through a first roller coating procedure, the roller coating procedure including a UV semi-curing operation; forming a surface coating layer on the prime coating layer through a second roller coating procedure; performing an infrared self-leveling treatment on the semi-manufactured board processed by the first roller coating procedure and the second roller coating procedure; and forming a UV coating layer by performing a film pressing solidification on a surface cured film disposed on the semi-manufactured board processed by the infrared self-leveling treatment.

In some embodiments, the forming the UV coating layer by performing the film pressing solidification on the surface cured film disposed on the semi-manufactured board processed by the infrared self-leveling treatment may include forming a medium/high gloss UV coating layer in the air by performing an intermolecular solidification between the surface cured film and the semi-manufactured board processed by the infrared self-leveling treatment using a UV ultraviolet lamp, wherein a polyethylene terephthalate (PET) polyester film may be used as the surface cured film; or forming a skin-feeling UV coating layer under an inert gas by performing an intermolecular automated ordering between the surface cured film and the semi-manufactured board processed by the infrared self-leveling treatment using a UV excimer lamp, wherein a macromolecule polyester skin-feeling film may be used as the surface cured film.

In some embodiments, the method may further include pretreating raw materials of the first structural layer before the raw materials of the first structural layer and the second structural layer is extruded through the coextrusion extruder. The pretreating the raw materials of the first structural layer may include obtaining a first ingredient by stirring and heating the raw materials of the first structural layer to a first preset temperature, mixing at least one inorganic filler, at least one lubricant, and at least one stabilizer with the raw materials of the first structural layer, stirring and heating the mixture to a second preset temperature, and cooling the mixture from the second preset temperature to a third preset temperature. Components of the raw materials of the first structural layer may include polyvinyl chloride and a plasticizer.

In some embodiments, the components of raw materials of the first structural layer may include calcium carbonate, polyethylene wax, at least one stabilizer, and at least one colorant.

In some embodiments, the method may further include pretreating raw materials of the second structural layer before the raw materials of the first structural layer and the second structural layer is extruded through the coextrusion extruder. The pretreating the raw materials of the second structural layer may include obtain a second ingredient by stirring and heating the raw materials of the second structural layer to a fourth preset temperature, and cooling the raw materials of the second structural layer from the fourth preset temperature to a fifth preset temperature.

DETAILED DESCRIPTION

Figure 1:
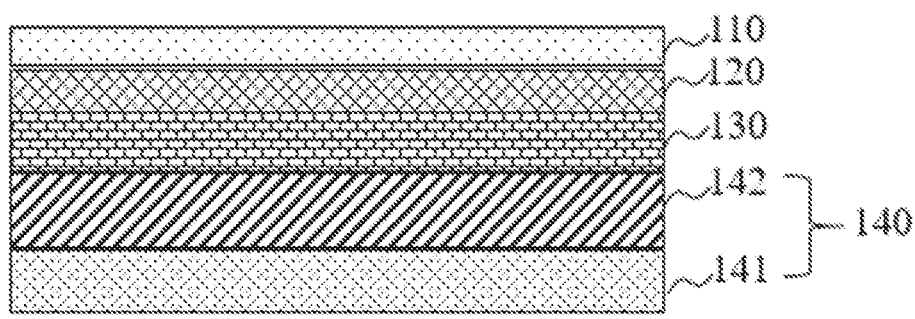
FIG. 1 is a cross-sectional view illustrating a composite decorative board 100 according to some embodiments of the present disclosure.

In order to more clearly describe the technical solutions of the embodiments of the present disclosure, the following will briefly introduce the drawings needed in the description of the embodiments. Obviously, the drawings in the following description are only some examples or embodiments of the present disclosure. For those ordinary skilled in the art, the present disclosure may be applied to other similar scenarios according to these drawings without creative work. Unless obviously obtained from the context or the context illustrates otherwise, the same numeral in the drawings may refer to the same structure or operation. It should be understood that the drawings are only for illustration and description purposes, and are not intended to limit the scope of the present disclosure. It should be understood that the drawings are not drawn to scale.

It should be understood that, in order to facilitate the description of the present disclosure, a positional relationship indicated by the terms "center," "upper surface," "lower surface," "upper," "lower," "top," "bottom," "inner," "outer," "axial," "radial," "peripheral," "outer," etc. are based on a positional relationship shown in the drawings, rather than indicating that the device, component, or unit must have a specific positional relationship. It should not be understood as a limitation of the present disclosure. However, if other words can achieve the same purpose, the words may be replaced by other expressions.

As used herein, the singular forms "a," "an," and "the" may be intended to include the plural forms as well, unless the context clearly indicates otherwise. Generally, the terms "comprise" and "include" when used in this disclosure, specify the presence of stated operations and elements, but do not preclude the presence or addition of one or more other operations, elements thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

FIG. 1 is a cross-sectional view illustrating a composite decorative board 100 according to some embodiments of the present disclosure. In this embodiment, as shown in FIG. 1, the composite decorative board 100 may have a multi-layer structure. The composite decorative board 100 may include a substrate layer 140. The substrate layer 140 may include at least one first structural layer 141 and at least one second structural layer 142. The second structural layer 142 may be disposed on first structural layer 141.

The composite decorative board 100 may include or may not include other layers between the first structural layer 141 and the second structural layer 142. In some embodiments, the first structural layer 141 and the second structural layer 142 may be adhered by hot pressing. In some embodiments, the second structural layer 142 may be disposed on the first structural layer 141 through a binder. The binder refers to a substance that binds objects to each other. For example, the binder may include polylactide (PLA) resin, phenol resin, or the like.

Figure 2:
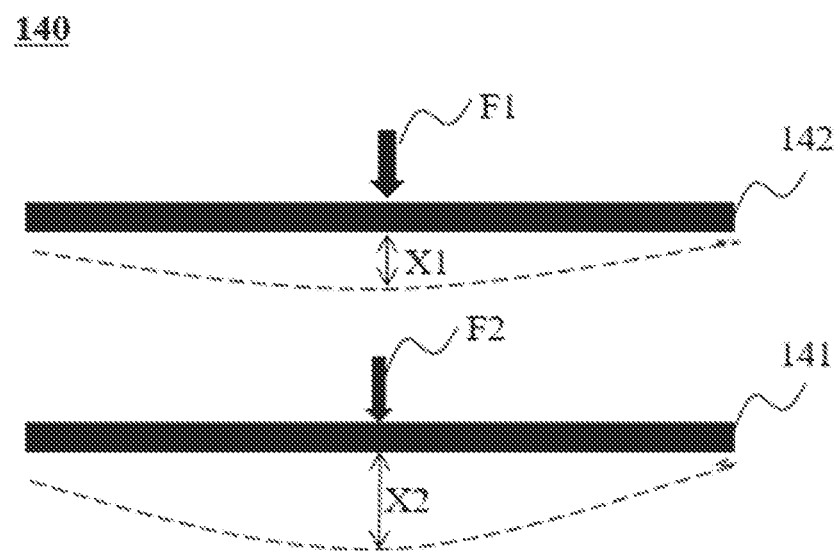
FIG. 2 is a schematic diagram illustrating a force effect of a first structural layer and a second structural layer according to some embodiments of the present disclosure.

In some embodiments, the first structural layer 141 may be a structural layer that controls thermal expansion and cold contraction of the composite decorative board 100. For example, the first structural layer 141 may be used to control thermal expansion and cold contraction of other layers in the composite decorative board 100 except for the substrate layer 140. As another example, the first structural layer 141 may cooperate with other layers (e.g., an ultraviolet (UV) coating layer 110, a wear-resistant layer 120, and/or a printed decorative layer 130) of the composite decorative board 100 to improve a stability of the composite decorative board 100. In some embodiments, the first structural layer 141 may be an elastic layer. The elastic layer refers to a layer that is elastic by using specific materials. Therefore, the elastic layer may recover from deformation when the elastic layer is subjected to an external force less than an elastic limit. For illustration, FIG. 2 is taken as an example. The first structural layer 141 is subjected to a force F2 perpendicular to the first structural layer 141. When a deformation of the first structural layer 141 is less than X2, the first structural layer 141 may recover from the deformation. In some embodiments, the elastic limit may be determined based on the elastic layer. For example, elastic layers of different materials may have different elastic limits. For instance, rubber and sponge may correspond to different elastic limits.

In some embodiments, the first structural layer 141 may be made of a plurality of components. Correspondingly, the first structural layer 141 may include a plurality of components. In some embodiments, the components of the first structural layer 141 may include at least one plasticizer, at least one toughening agent, and at least one impact resistance auxiliary. A content of the toughening agent and a content of the impact resistance auxiliary may be less than a preset threshold. The preset threshold may be specifically set according to actual needs. In some embodiments, the preset threshold may be as small as possible. For example, as for 323.45 parts by weight of the first structural layer 141, the preset threshold may be 0.01 parts by weight. In some embodiments, as for 323.45 parts by weight of the first structural layer 141, the content of the toughening agent and the content of the impact resistance auxiliary may be smaller than 0.01 parts by weight. In some embodiments, as for 323.45 parts by weight of the first structural layer 141, the content of the toughening agent and the content of the impact resistance auxiliary may be smaller than 0.005 parts by weight. When the content of the toughening agent and the content of the impact resistance auxiliary are smaller than the above values, a strength of the first structural layer 141 or the composite decorative board 100 may be enhanced, and an impact resistance of the first structural layer 141 or the composite decorative board 100 may be improved. In some embodiments, the content of the toughening agent and the content of the impact resistance auxiliary of the first structural layer 141 may be zero. In some embodiments, the impact resistance auxiliary may be referred as an "impact resistance agent."

In some embodiments, the plasticizer refers to a substance added to a polymer that may increase a plasticity and flexibility of the polymer. For example, the plasticizer may include dibutyl phthalate (DBP), dioctyl phthalate (DOP), epoxy soybean oil, tricresyl phosphate, triphenyl phosphate, dioctyl sebacate, chlorinated paraffin, or the like, or any combination thereof. The plasticizer may also include other substances that meet the definition of the plasticizer.

In some embodiments, the plasticizer may include epoxy groups. An epoxy group refers to a group including a structure of "—CH(O)CH—." Specifically, the plasticizer may be a compound including an epoxy group. For example, the plasticizer may include epoxy linseed oil and/or an epoxy soybean oil, etc. The epoxy linseed oil has a good heat resistance, a light resistance, an interpenetration, a low-temperature flexibility, a low volatility, and no toxicity.

Since the plasticizer includes the epoxy group, the epoxy group may trap free radicals "Cl—" degraded and separated from polyvinyl chloride (PVC) (e.g., a PVC coating layer on a surface of the composite decorative board 100) included in the composite decorative board 100, which may terminate free radical reactions of the PVC degradation, slow down a degradation rate, and significantly improve a light resistance, a heat resistance, and an oil resistance of the composite decorative board 100. Therefore, the composite decorative board 100 may have a good mechanical strength, a weather resistance, and an electrical property.

As mentioned above, the plasticizer may be the epoxy linseed oil. The epoxy linseed oil has a plasticizing effect on the PVC, which may stabilize active chlorine atoms on PVC chains, and quickly absorb "HCl" molecules degraded due to heat and light, thus preventing continuous decomposition of the PVC chains, and improving a stability of the PVC in the composite decorative board 100. In addition, the epoxy linseed oil may also plasticize the elastic layer and improve an overall elasticity and silence performance of the composite decorative board 100.

In some embodiments, the toughening agent refers to a substance that may increase a flexibility of a film of the binder. In some embodiments, the toughening agent may include a rubber toughening agent, a toughening agent based on a thermoplastic elastomer, or toughening agents of other types. Various types of toughening agents may include a plurality of substances. For example, the rubber toughening agent may include a liquid polysulfide rubber, a liquid acrylate rubber, etc. The toughening agent based on the thermoplastic elastomer may include styrene, polyolefin, etc. Other toughening agents may include phthalate esters, or the like.

In some embodiments, the impact resistance auxiliary refers to an auxiliary that can improve an impact performance of a polymer. For example, the impact resistance auxiliary may include polyvinyl chloride, acrylic rubber, or the like.

In some embodiments, a thickness of the first structural layer 141 may be 0.5-2.5 millimeters. In some embodiments, the thickness of the first structural layer 141 may be 0.6-2.3 millimeters. In some embodiments, the thickness of the first structural layer 141 may be 0.7-2.1 millimeters. In some embodiments, the thickness of the first structural layer 141 may be 0.8-1.9 millimeters. In some embodiments, the thickness of the first structural layer 141 may be 0.9-1.7 millimeters. In some embodiments, the thickness of the first structural layer 141 may be 1.0-1.5 millimeters. In some embodiments, the thickness of first structural layer 141 may be 1.1-1.4 millimeters. In some embodiments, the thickness of the first structural layer 141 may be 1.2-1.3 millimeters. It may be seen from the above description that the first structural layer 141 is a layer that controls thermal expansion and cold contraction of the composite decorative board 100. If the thickness of the first structural layer 141 is set to a value lower than 1.0 millimeter, since the thickness is too small, the plasticizer in the first structural layer 141 may have a poor toughening effect and may not effectively match the thermal expansion and cold contraction of other layers in the composite decorative board 100, thereby reducing a structural stability of the composite decorative board 100. If the thickness of the first structural layer 141 is set to a value higher than 1.5 millimeters, since the first structural layer 141 is too large and the composite decorative board 100 has a multi-layer structure, the overall thickness of the composite decorative board 100 may be too thick and inconvenient for an installation and use of the composite decorative board 100.

Preferably, the thickness of the first structural layer 141 may be 1.2 millimeters. By setting the thickness of the first structural layer 141 to 1.2 millimeters, an excessive thickness of the composite decorative board 100 may be avoid. Further, the structural stability of the composite decorative board 100 may be effectively ensured. In addition, a warpage, deformation, contraction, and expansion of the composite decorative board 100 may be effectively limited.

Generally, a content of each component of the first structural layer 141 may affect the performance of the first structural layer 141, and further affect the performance of the entire composite decorative board 100. Therefore, the corresponding content of each component in the first structural layer 141 may be determined. As described above, the component of the first structural layer 141 may include the plasticizer. In some embodiments, as for 323.45 parts by weight of the first structural layer 141, the components of the first structural layer 141 may include 10-20 parts by weight of the plasticizer. In some embodiments, as for 323.45 parts by weight of the first structural layer 141, the components of the first structural layer 141 may include 12-18 parts by weight of the plasticizer. In some embodiments, as for 323.45 parts by weight of the first structural layer 141, the components of the first structural layer 141 may include 14-16 parts by weight of the plasticizer. In some embodiments, as for 323.45 parts by weight of the first structural layer 141, the components of the first structural layer 141 may include 15 parts by weight of the plasticizer. Based on the plasticizer and the first structural layer 141 in the above weight range, performances of high polymer materials in the first structural layer 141 may be improved to a maximum extent, a manufacture cost may be reduced, and a manufacture efficiency may be improved.

In some embodiments, the first structural layer 141 may also be made based on other components. In some embodiments, the components of the first structural layer 141 may further include polyvinyl chloride, calcium carbonate, polyethylene wax, a stabilizer, at least one colorant, or the like, or any combination thereof.

In some embodiments, as for 323.45 parts by weight of the first structural layer 141, the components of the first structural layer 141 may further include 90-100 parts by weight of the polyvinyl chloride, 200-250 parts by weight of the calcium carbonate, 0.1-0.3 parts by weight of the polyethylene wax, 2-4 parts by weight of the stabilizer, and 0.1-0.4 parts by weight of the at least one colorant.

In some embodiments, as for 323.45 parts by weight of the first structural layer 141, the components of the first structural layer 141 may further include 90-100 parts by weight of the polyvinyl chloride, 200-250 parts by weight of the calcium carbonate, 0.1-0.3 parts by weight of the polyethylene wax, 2-4 parts by weight of the stabilizer, and 0.1-0.4 parts by weight of the at least one colorant. In some embodiments, the parts by weight of the polyvinyl chloride may be 90-100. In some embodiments, the parts by weight of the polyvinyl chloride may be 92-98. In some embodiments, the parts by weight of the polyvinyl chloride may be 94-96. In some embodiments, the parts by weight of the calcium carbonate may be 200-250. In some embodiments, the parts by weight of the calcium carbonate may be 210-240. In some embodiments, the parts by weight of the calcium carbonate may be 220-230. In some embodiments, the parts by weight of the polyethylene wax may be 0.1-0.3. In some embodiments, the parts by weight of the polyethylene wax may be 0.15-0.25. In some embodiments, the parts by weight of the stabilizer may be 2-4. In some embodiments, the parts by weight of the stabilizer may be 2.5-3.5. In some embodiments, the parts by weight of the at least one colorant may be 0.1-0.4. In some embodiments, the parts by weight of the at least one colorant may be 0.2-0.3. The content of each component (e.g., the polyvinyl chloride and the calcium carbonate) of the first structural layer 141 may be specifically set according to actual needs. For example, the components of the first structural layer 141 may include 95 parts by weight of the polyvinyl chloride, 220 parts by weight of the calcium carbonate, 0.2 parts by weight of the polyethylene wax, 3 parts by weight of the stabilizer, and 0.2 parts by weight of the at least one colorant. As another example, the components of the first structural layer 141 may include 95 parts by weight of the polyvinyl chloride, 225 parts by weight of the calcium carbonate, 0.2 parts by weight of the polyethylene wax, 3 parts by weight of the stabilizer, and 0.25 parts by weight of the at least one colorant.

In some embodiments, the colorant may include, but not be limited to, an oil-soluble colorant, a water-soluble colorant, a gel-like colorant, a pastel pigment, a pigment, a dye, or the like, or any combination thereof. In some embodiments, the colorant may be carbon black.

As mentioned above, the content of each component of the first structural layer 141 may affect the performance of the first structural layer 141, and further affect the performance of the entire composite decorative board 100. More specific descriptions regarding the content of each component affecting the performance of the composite decorative board 100 may be found in the following descriptions, which is not repeated herein.

In some embodiments, the second structural layer 142 may be a structural layer that provides an overall strength and hardness of the composite decorative board 100. In some embodiments, the second structural layer 142 may be a rigid layer. The rigid layer refers to a layer made of specific materials so that the rigid layer has little or no deformation under an action of a great external force. Specifically, the rigid layer may have little or no deformation when the external force is less than a hardness of the rigid layer. For illustration, FIG. 2 is taken as an example. The second structural layer 142 is subjected to a force F1 perpendicular to the second structural layer 142. When a deformation of the second structural layer 142 is less than X1, the second structural layer 142 may recover from the deformation. In some embodiments, the hardness may be determined based on the rigid layer. For example, rigid layers of different materials may have different elastic limits. For instance, marble and steel board may have different elastic limits.

In the embodiments of the present disclosure, the composite decorative board 100 may have the multi-layer structure. The substrate layer 140 included herein may be configured as a two-layer structure including the first structural layer 141 (i.e., the elastic layer) and the second structural layer 142 (i.e., the rigid layer). Since the elastic layer includes a large content of the plasticizer and small contents of the toughening agent and the impact resistance auxiliary (e.g., as for 323.45 parts by weight of the elastic layer, the elastic layer may include 10-20 parts by weight of the plasticizer, the content of the toughening agent and the content of the impact resistance auxiliary may be smaller than 0.01 parts by weight), a content of the resin in the elastic layer may be relatively large. The elastic layer may be toughened by the plasticizer. Therefore, the elastic layer may have high thermal expansion and cold contraction, which may be effectively match the thermal expansion and cold contraction of other layers (e.g., the UV coating layer 110 or the wear-resistant layer 120 described later) in the composite decorative board 100, and cooperate with the rigid layer to improve the structural stability of the composite decorative board 100, thereby effectively limiting the warpage, deformation, contraction, and expansion of the composite decorative board 100.

In some embodiments, the second structural layer 142 may be made of a plurality of components. In some embodiments, the components of the second structural layer 142 may include polyvinyl chloride, calcium carbonate, polyethylene wax, a stabilizer, stearic acid, and a forming agent of acrylate resin coordinating a metal ion.

Generally, a content of each component of the second structural layer 142 may affect performances of the second structural layer 142, and further affect the performance of the entire composite decorative board 100. In some embodiments, as for 464.7 parts by weight of the second structural layer, the components of the second structural layer may include 90-110 parts by weight of the polyvinyl chloride, 300-400 parts by weight of the calcium carbonate, 1.0-1.6 parts by weight of the polyethylene wax, 5-7 parts by weight of the stabilizer, 1.1-1.7 parts by weight of the stearic acid, and 5-7 parts by weight of the forming agent of acrylate resin coordinating the metal ion.

In some embodiments, the parts by weight of the polyvinyl chloride may be 92-108. In some embodiments, the parts by weight of the polyvinyl chloride may be 94-106. In some embodiments, the parts by weight of the polyvinyl chloride may be 96-104. In some embodiments, the parts by weight of the polyvinyl chloride may be 98-102. In some embodiments, the parts by weight of the polyvinyl chloride may be 100.

In some embodiments, the parts by weight of the calcium carbonate may be 310-390. In some embodiments, the parts by weight of the calcium carbonate may be 320-380. In some embodiments, the parts by weight of the calcium carbonate may be 330-370. In some embodiments, the parts by weight of the calcium carbonate may be 340-360. In some embodiments, the parts by weight of the calcium carbonate may be 350.

In some embodiments, the parts by weight of the polyethylene wax may be 1.0-1.6. In some embodiments, the parts by weight of the polyethylene wax may be 1.1-1.5. In some embodiments, the parts by weight of the polyethylene wax may be 1.2-1.4. In some embodiments, the parts by weight of the polyethylene wax may be 1.3.

In some embodiments, the parts by weight of the stabilizer may be 5-7. In some embodiments, the parts by weight of the stabilizer may be 5.5-6.5. In some embodiments, the parts by weight of the stabilizer may be 6.

In some embodiments, the parts by weight of the stearic acid may be 1.1-1.7. In some embodiments, the parts by weight of the stearic acid may be 1.2-1.6. In some embodiments, the parts by weight of the stearic acid may be 1.3-1.5. In some embodiments, the parts by weight of the stearic acid may be 1.4.

In some embodiments, the parts by weight of the forming agent of acrylate resin coordinating the metal ion may be 5-7. In some embodiments, the parts by weight of the forming agent of acrylate resin coordinating the metal ion may be 5.2-6.8. In some embodiments, the parts by weight of the forming agent of acrylate resin coordinating the metal ion may be 5.4-6.6. In some embodiments, the parts by weight of the forming agent of acrylate resin coordinating the metal ion may be 5.6-6.4. In some embodiments, the parts by weight of the forming agent of acrylate resin coordinating the metal ion may be 5.8-6.2. In some embodiments, the parts by weight of the forming agent of acrylate resin coordinating the metal ion may be 6.

Therefore, the corresponding content of each component in the second structural layer 142 may be determined. In some embodiments, as for 464.7 parts by weight of the second structural layer 142, the components of the second structural layer 142 may include 100 parts by weight of the polyvinyl chloride, 350 parts by weight of the calcium carbonate, 1.3 parts by weight of the polyethylene wax, 6 parts by weight of the stabilizer, 1.4 parts by weight of the stearic acid, and 6 parts by weight of the forming agent of acrylate resin coordinating the metal ion.

In some embodiments, the stabilizer refers to an agent that keeps a structure of a polymer compound stable and prevents a decomposition and aging of the polymer compound. For example, the stabilizer may include calcium stearate or a dibasic lead salt.

In some embodiments, the forming agent of acrylate resin coordinating the metal ion refers to an auxiliary that causes an acceleration on plastination in a molding process during a stage of plastic processing and molding. The auxiliary may improve a dispersibility and a mobility of the material. In some embodiments, the auxiliary may have micro-crosslink with the polyvinyl chloride to improve the weather resistance and the impact resistance of the first structural layer 141 or the composite decorative board 100. In some embodiments, the forming agent of acrylate resin coordinating the metal ion may be replaced with propionic acid lipid. In some embodiments, the propionic acid lipid may include propyl propionate, methyl propionate, or the like.

In some embodiments, a thickness of the second structural layer 142 may be 3.0-6.5 millimeters. In some embodiments, the thickness of the second structural layer 142 may be 3.5-6.0 millimeters. In some embodiments, the thickness of the second structural layer 142 may be 4-5.5 millimeters. In some embodiments, the thickness of the second structural layer 142 may be 4.5-5 millimeters. Since the second structural layer 142 is a structural layer that provides the overall strength and hardness of the composite decorative board 100, if the thickness of the second structural layer 142 is set to a value lower than 3.0 millimeters, the second structural layer 142 may be too small. Therefore, the hardness of the entire composite decorative board 100 may not satisfy requirements, the impact resistance of the composite decorative board 100 may be reduced, and the composite decorative board 100 may be easily broken. The composite decorative board 100 may be inconvenient for transportation. If the thickness of the second structural layer 142 is set to a value higher than 6.5 millimeters, since the thickness of the second structural layer 142 is too large and the composite decorative board 100 has the multi-layer structure, the overall thickness of the composite decorative board 100 may be too large, which is inconvenient for the installation and use of the composite decorative board 100. In some embodiments, the thickness of the second structural layer 142 may be 4.0 millimeters. By setting the thickness of the second structural layer 142 to be 3.0-6.5 millimeters, the hardness of the composite decorative board 100 may be ensured, and a weight of the composite decorative board 100 may be prevented from being too heavy. By setting the thickness of the first structural layer 141 to 1.2 millimeters and the thickness of the second structural layer 142 to 4.0 millimeters, the first structural layer 141 and the second structural layer 142 may be cooperated. Therefore, the structural stability of the composite decorative board 100 may be ensured to have a better performance. The composite decorative board 100 may be prevented from being too thick.

In some embodiments, the composite decorative board 100 may further include the UV coating layer 110 disposed on the second structural layer 142. In some embodiments, the UV coating layer 110 may be disposed on the second structural layer 142 through a binder. The binder refers to a substance that binds objects to each other. For example, the binder may include a polylactide (PLA) resin, a phenol resin, or the like.

The UV coating layer 110 may be understood as a cured coating layer covering a surface of an object. In some embodiments, the UV coating layer 110 may at least include one or both of a primer coating layer or a surface coating layer. As used herein, the primer coating layer refers to a first layer of base paint coating that directly covers the surface of the object. The surface coating layer refers to a second layer of paint coating that covers an upper surface of the primer coating layer of the object.

In some embodiments, the primer coating layer may have a mass per unit area of 10-15 g/m$^2$. In some embodiments, the primer coating layer may have a mass per unit area of 11-14 g/m$^2$. In some embodiments, the primer coating layer may have a mass per unit area of 12-13 g/m$^2$. In some embodiments, the primer coating layer may have a mass per unit area of 12.5 g/m$^2$. In some embodiments, the surface coating layer may have a mass per unit area of 60-70 g/m$^2$. In some embodiments, the surface coating layer may have a mass per unit area of 62-68 g/m$^2$. In some embodiments, the surface coating layer may have a mass per unit area of 64-66 g/m$^2$. In some embodiments, the surface coating layer may have a mass per unit area of 65 g/m$^2$. Since thicknesses of the primer coating layer and the surface coating layer may affect a gloss of the composite decorative board, by setting the thickness of the primer coating layer and the surface coating layer to the above values, the gloss of the composite decorative board may be ensured, while avoiding that the thickness of the entire composite decorative board 100 is affected by the excessively thick of the primer coating layer and the surface coating layer. At the same time, the primer coating layer may also increase an adhesion of the surface coating layer, thereby improving a firmness of the entire composite decorative board 100.

In some embodiments, the components of the primer coating layer may include 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1.0-3.0 parts by weight of fumed silica.

In some embodiments, the components of the surface coating layer may include 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1.0-3.0 parts by weight of fumed silica.

In some embodiments, the components of the primer coating layer and the components of the surface coating layer may be the same or different.

In some embodiments, as for 100.9 parts by weight of the primer coating layer and/or the surface coating layer, the components of the primer coating layer and/or the surface coating layer may include 25-50 parts by weight of the hyperbranched polyester polyfunctional acrylic resin. In some embodiments, as for 100.9 parts by weight of the primer coating layer and/or the surface coating layer, the components of the primer coating layer and/or the surface coating layer may include 30-45 parts by weight of the hyperbranched polyester polyfunctional acrylic resin. In some embodiments, as for 100.9 parts by weight of the primer coating layer and/or the surface coating layer, the components of the primer layer and/or the surface coating layer may include 35-40 parts by weight of the hyperbranched polyester polyfunctional acrylic resin. In some embodiments, as for 100.9 parts by weight of the primer coating layer and/or the surface coating layer, the components of the primer coating layer and/or the surface coating layer may include 37.5 parts by weight of the hyperbranched polyester polyfunctional acrylic resin.

In some embodiments, as for 100.9 parts by weight of the primer coating layer and/or the surface coating layer, the components of the primer coating layer and/or the surface coating layer may include 20-30 parts by weight of the modified epoxy acrylic resin. In some embodiments, as for 100.9 parts by weight of the primer coating layer and/or the surface coating layer, the components of the primer coating layer and/or the surface coating layer may include 22-28 parts by weight of the modified epoxy acrylic resin. In some embodiments, as for 100.9 parts by weight of the primer coating layer and/or the surface coating layer, the components of the primer coating layer and/or the surface coating layer may include 24-26 parts by weight of the modified epoxy acrylic resin. In some embodiments, as for 100.9 parts by weight of the primer coating layer and/or the surface coating layer, the components of the primer coating layer and/or the surface coating layer may include 25 parts by weight of the modified epoxy acrylic resin.

In some embodiments, as for 100.9 parts by weight of the primer coating layer and/or the surface coating layer, the components of the primer coating layer and/or the surface coating layer may include 30-40 parts by weight of the hydroxyethyl methacrylate. In some embodiments, as for 100.9 parts by weight of the primer coating layer and/or the surface coating layer, the components of the primer coating layer and/or the surface coating layer may include 32-38 parts by weight of the hydroxyethyl methacrylate. In some embodiments, as for 100.9 parts by weight of the primer coating layer and/or the surface coating layer, the components of the primer coating layer and/or the surface coating layer may include 34-36 parts by weight of the hydroxyethyl methacrylate. In some embodiments, as for 100.9 parts by weight of the primer coating layer and/or the surface coating layer, the components of the primer coating layer and/or the surface coating layer may include 35 parts by weight of the hydroxyethyl methacrylate.

In some embodiments, as for 100.9 parts by weight of the primer coating layer and/or the surface coating layer, the components of the primer coating layer and/or the surface coating layer may include 0.8-2.0 parts by weight of the 1-hydroxycyclohexane phenyl ketone. In some embodiments, as for 100.9 parts by weight of the primer coating layer and/or the surface coating layer, the components of the primer coating layer and/or the surface coating layer may include 1.0-1.8 parts by weight of the 1-hydroxycyclohexane phenyl ketone. In some embodiments, as for 100.9 parts by weight of the primer coating layer and/or the surface coating layer, the components of the primer coating layer and/or the surface coating layer may include 1.2-1.6 parts by weight of the 1-hydroxycyclohexane phenyl ketone. In some embodiments, as for 100.9 parts by weight of the primer coating layer and/or the surface coating layer, the components of the primer coating layer and/or the surface coating layer may include 1.3-1.5 parts by weight of the 1-hydroxycyclohexane phenyl ketone. In some embodiments, as for 100.9 parts by weight of the primer coating layer and/or the surface coating layer, the components of the primer coating layer and/or the surface coating layer may include 1.4 parts by weight of the 1-hydroxycyclohexane phenyl ketone.

In some embodiments, as for 100.9 parts by weight of the primer coating layer and/or the surface coating layer, the components of the primer coating layer and/or the surface coating layer may include 1.0-3.0 parts by weight of the fumed silica. In some embodiments, as for 100.9 parts by weight of the primer coating layer and/or the surface coating layer, the components of the primer coating layer and/or the surface coating layer may include 1.2-2.8 parts by weight of the fumed silica. In some embodiments, as for 100.9 parts by weight of the primer coating layer and/or the surface coating layer, the components of the primer coating layer and/or the surface coating layer may include 1.4-2.6 parts by weight of the fumed silica. In some embodiments, as for 100.9 parts by weight of the primer coating layer and/or the surface coating layer, the components of the primer coating layer and/or the surface coating layer may include 1.6-2.4 parts by weight of the fumed silica. In some embodiments, as for 100.9 parts by weight of the primer coating layer and/or the surface coating layer, the components of the primer coating layer and/or the surface coating layer may include 1.8-2.2 parts by weight of the fumed silica. In some embodiments, as for 100.9 parts by weight of the primer coating layer and/or the surface coating layer, the components of the primer coating layer and/or the surface coating layer may include 2 parts by weight of the fumed silica.

A content of each component of the primer coating layer and/or the surface coating layer may be specifically set according to actual needs. For example, as for 93 parts by weight of the primer coating layer and/or the surface coating layer, the primer coating layer and/or the surface coating layer may include 30 parts by weight of the hyperbranched polyester polyfunctional acrylic resin, 25 parts by weight of the modified epoxy acrylic resin, 35 parts by weight of the hydroxyethyl methacrylate, 1.0 part by weight of the 1-hydroxycyclohexane phenyl ketone, and 2 parts by weight of the fumed silica. As another example, as for 100.9 parts by weight of the primer coating layer and/or the surface coating layer, the primer coating layer and/or the surface coating layer may include 37.5 parts by weight of the hyperbranched polyester polyfunctional acrylic resin, 25 parts by weight of the modified epoxy acrylic resin, 35 parts by weight of the hydroxyethyl methacrylate, 1.4 parts by weight of the 1-hydroxycyclohexane phenyl ketone, and 2 parts by weight of the fumed silica. In some embodiments, the composite decorative board 100 may further include the wear-resistant layer 120 disposed under the UV coating layer 110 and the printed decorative layer 130 disposed under the wear-resistant layer 120.

In some embodiments, the wear-resistant layer 120 refers to a layer made of specific materials so that a mechanical abrasion of the layer is small or does not occur. Specifically, under a condition of a certain load and a wear speed, an abrasion per unit area per unit time may be less than a preset threshold. The preset threshold may be specifically determined according to the wear-resistant layer 120. In some embodiments, a thickness of the wear-resistant layer 120 refers to a distance between upper and lower surfaces of the wear-resistant layer 120.

In some embodiments, the thickness of wear-resistant layer 120 may match the components and/or performance of the first structural layer 141 and the second structural layer 142, so that the entire performance of the composite decorative board 100 may have a better stability. For example, the thickness of the wear-resistant layer 120 may be 0.45-0.50 millimeters. When the thickness of the wear-resistant layer 120 is within the above range, the wear-resistant layer 120 may cooperate with other layers (e.g., the substrate layer, the printed decorative layer, the UV coating layer) to control the surface of the composite decorative board to have important physical and chemical properties, such as an abrasion resistance, a scratch resistance, a cigarette burn resistance, a pollution resistance, a corrosion resistance, a moisture resistance, a deformation resistance, etc.

In some embodiments, the printed decorative layer 130 may be a decorative layer printed with a decorative pattern. It should be understood that the decorative pattern of the printed decorative layer 130 may be specifically set according to actual needs.

In some embodiments, the UV coating layer 110 and the wear-resistant layer 120, and the wear-resistant layer 120 and the printed decorative layer 130 may be connected through a binder. The binder refers to a substance that binds objects to each other. For example, the binder may include a polylactide (PLA) resin, a phenol resin, or the like.

In some embodiments, a warpage of the composite decorative board 100 at room temperature may be within a range of 0.4-0.6 millimeters. In some embodiments, the warpage of the composite decorative board 100 at room temperature may be within a range of 0.42-0.58 millimeters. In some embodiments, the warpage of the composite decorative board 100 at room temperature may be within a range of 0.44-0.56 millimeters. In some embodiments, the warpage of the composite decorative board 100 at room temperature may be within a range of 0.46-0.54 millimeters. In some embodiments, the warpage of the composite decorative board 100 at room temperature may be within a range of 0.48-0.52 millimeters. In some embodiments, the warpage of the composite decorative board 100 may be 0.5 millimeters.

In some embodiments, a thermal warpage of the composite decorative board 100 may be within a range of 0.6-0.81 millimeters. In some embodiments, the thermal warpage of the composite decorative board 100 may be within a range of 0.62-0.78 millimeters. In some embodiments, the thermal warpage of the composite decorative board 100 may be within a range of 0.64-0.76 millimeters. In some embodiments, the thermal warpage of the composite decorative board 100 may be within a range of 0.66-0.74 millimeters. In some embodiments, the thermal warpage of the composite decorative board 100 may be within a range of 0.68-0.72 millimeters. In some embodiments, the thermal warpage of the composite decorative board 100 may be 0.7 millimeters.

In some embodiments, a thermal dimensional change rate of the composite decorative board 100 may be within a range of 0.05-0.09%. In some embodiments, the thermal dimensional change rate of the composite decorative board 100 may be within a range of 0.055-0.085%. In some embodiments, the thermal dimensional change rate of the composite decorative board 100 may be within a range of 0.06-0.08%. In some embodiments, the thermal dimensional change rate of the composite decorative board 100 may be within a range of 0.065-0.075%. In some embodiments, the thermal dimensional change rate of the composite decorative board 100 may be 0.07%.

In some embodiments, a low-temperature dimensional change rate of the composite decorative board 100 may be within a range of 0.07-0.15%. In some embodiments, the low-temperature dimensional change rate of the composite decorative board 100 may be within a range of 0.075-0.14%. In some embodiments, the low-temperature dimensional change rate of the composite decorative board 100 may be within a range of 0.08-0.13%. In some embodiments, the low-temperature dimensional change rate of the composite decorative board 100 may be within a range of 0.085-0.12%. In some embodiments, the low-temperature dimensional change rate of the composite decorative board 100 may be within a range of 0.09-0.11%. In some embodiments, the low-temperature dimensional change rate of the composite decorative board 100 may be within a range of 0.095-0.1%.

In some embodiments, a fracture resistance elongation displacement of the composite decorative board 100 may be within a range of 12-15 millimeters. In some embodiments, the fracture resistance elongation displacement of the composite decorative board 100 may be within a range of 12.5-14.5 millimeters. In some embodiments, the fracture resistance elongation displacement of the composite decorative board 100 may be within a range of 13-14 millimeters. In some embodiments, the fracture resistance elongation displacement of the composite decorative board 100 may be within a range of 13.2-13.8 millimeters. In some embodiments, the fracture resistance elongation displacement of the composite decorative board 100 may be within a range of 13.4-13.6 millimeters.

In some embodiments, a hardness of the elastic layer may be within a range of 67-75 HD. In some embodiments, the hardness of the elastic layer may be within a range of 68-74 HD. In some embodiments, the hardness of the elastic layer may be within a range of 69-73 HD. In some embodiments, the hardness of the elastic layer may be within a range of 70-72 HD. In some embodiments, the hardness of the elastic layer may be 71 HD.

It should be noted that the above description of the composite decorative board 100 is merely for convenience of description, and does not limit the present disclosure within the scope of the examples mentioned. It may be understood that for those skilled in the art, after understanding the principles of FIG. 1 and FIG. 2, it is possible to add one of the above layers to other positions, or delete one of the above layers without departing from these principles. For example, the first structural layer 141 may be disposed between the printed decorative layer 130 and the second structural layer 142. As another example, the printed decorative layer 130 may be removed. It should be understood that similar transformations are all within the scope of the embodiments of the present disclosure.

As mentioned above, the content of each component of the first structural layer 141 and the second structural layer 142 may affect the performance of the entire composite decorative board 100. In order to clearly and completely explain how the content of each component affects the performance of the composite decorative board 100, the following may combine the components based on the first structural layer 141 or the second structural layer 142 with different contents, test results including performances of the composite decorative board 100 may be explained in detail.

In some embodiments, different weight contents of the plasticizer in 323.45 parts by weight of the first structural layer 141 have different effects on the performance of the composite decorative board 100. Specifically, the specific effects of the contents of the plasticizer on the performance of the composite decorative board 100 may be reflected through the following sets of test results.

In this embodiment, the test results may include performances of the first structural layer 141 of the composite decorative board 100 in terms of a warpage at room temperature (ISO23999, 2.0 millimeters), a thermal warpage (ISO23999, millimeters), a thermal dimensional change rate (ISO23999, ≤0.25%), a low-temperature dimensional change rate (ISO23999, ≤0.25%), a fracture resistance elongation displacement, and a hardness (GB/T2411). As used herein, the warpage at room temperature refers to a degree of distortion of a surface of ab object at 23±2° C. The thermal warpage refers to a degree of distortion of an object when the object is returned to 23±2° C. after heated at 80° C. for 6 hours. The thermal dimensional change rate refers to a degree of change of a dimension of an object when the object is returned to 23±2° C. after heated at 80° C. for 6 hours. The low-temperature dimensional change rate refers to a degree of change of a dimension of an object when the object is returned to 23±2° C. after cooled down to −18° C. for 6 hours. The fracture resistance elongation displacement refers to a displacement that an object passes through when the object is crushed. The hardness of the first structural layer refers to an ability of the first structural layer to locally resist a hard object pressed into a surface of the first structural layer.

In the plurality of sets of experiments, the components of the second structural layer 142 in each set of the corresponding composite decorative board 100 may be set to be the same. For example, the components of the second structural layer 142 were set as 100 parts by weight of polyvinyl chloride, 350 parts by weight of calcium carbonate, 1.3 parts by weight of polyethylene wax, 6 parts by weight of a stabilizer, 1.4 parts by weight of stearic acid, and 6 parts by weight of a forming agent of acrylate resin coordinating a metal ion. At the same time, the components of each set of the first structural layer 141 were set to differ only in contents of plasticizers, specifically as follows.

(1) The components of the first structural layer 141 in a first set included 100 parts by weight of polyvinyl chloride, 250 parts by weight of calcium carbonate, 0.3 parts by weight of polyethylene wax, 4 parts by weight of a stabilizer (calcium stearate), 5 parts by weight of the plasticizer (epoxy linseed oil), and 0.4 parts by weight of carbon black.

(2) The components of the first structural layer 141 in a second set included 100 parts by weight of polyvinyl chloride, 250 parts by weight of calcium carbonate, 0.3 parts by weight of polyethylene wax, 4 parts by weight of a stabilizer (calcium stearate), 10 parts by weight of the plasticizer (epoxy linseed oil), and 0.4 parts by weight of carbon black.

(3) The components of the first structural layer 141 in a third set included 100 parts by weight of polyvinyl chloride, 250 parts by weight of calcium carbonate, 0.3 parts by weight of polyethylene wax, 4 parts by weight of a stabilizer (calcium stearate), 12 parts by weight of the plasticizer (epoxy linseed oil), and 0.4 parts by weight of carbon black.

(4) The components of the first structural layer 141 in a fourth set included 100 parts by weight of polyvinyl chloride, 250 parts by weight of calcium carbonate, 0.3 parts by weight of polyethylene wax, 4 parts by weight of a stabilizer (calcium stearate), 15 parts by weight of the plasticizer (epoxy linseed oil), and 0.4 parts by weight of carbon black.

(5) The components of the first structural layer 141 in a fifth set included 100 parts by weight of polyvinyl chloride, 250 parts by weight of calcium carbonate, 0.3 parts by weight of polyethylene wax, 4 parts by weight of a stabilizer (calcium stearate), 18 parts by weight of the plasticizer (epoxy linseed oil), and 0.4 parts by weight of carbon black.

(6) The components of the first structural layer 141 in a sixth set included 100 parts by weight of polyvinyl chloride, 250 parts by weight of calcium carbonate, 0.3 parts by weight of polyethylene wax, 4 parts by weight of a stabilizer (calcium stearate), 20 parts by weight of the plasticizer (epoxy linseed oil), and 0.4 part by weight of carbon black.

(7) The components of the first structural layer 141 in a seventh group included 100 parts by weight of polyvinyl chloride, 250 parts by weight of calcium carbonate, 0.3 parts by weight of polyethylene wax, 4 parts by weight of a stabilizer (calcium stearate), 25 parts by weight of plasticizer (epoxy linseed oil), and 0.4 parts by weight of carbon black.

Finally, based on a condition that the second structural layer 142 includes same components and the wear-resistant layer 120 has a same thickness, the above seven sets of the first structural layer 141 with different contents of the plasticizers may be used to obtain the test results including the performances in terms of the warpage at room temperature, the thermal warpage, the thermal dimensional change rate, the low-temperature dimensional change rate, the fracture resistance elongation displacement, and the hardness of the first structural layer 141 (i.e., the elastic layer) of the composite decorative board 100. The test results are as Table 1.

TABLE 1

Effects of contents of the plasticizer in the first structural layer of the composite decorative board 100 on the test of performance

| | Warpage at room temperature (23 ± 2° C.) | Thermal warpage (80° C.) | Thermal dimensional change rate (80° C.) | Low-temperature dimensional change rate | Fracture resistance elongation displacement | Hardness of the elastic layer |
|---|---|---|---|---|---|---|
| (1) | 1.2 mm | 1.5 mm | 0.20% | 0.25% | 8.2 mm | 80 HD |
| (2) | 0.45 mm | 0.60 mm | 0.05% | 0.073% | 12.1 mm | 75 HD |
| (3) | 0.46 mm | 0.60 mm | 0.06% | 0.080% | 12.5 mm | 72 HD |
| (4) | 0.55 mm | 0.8 mm | 0.08% | 0.10% | 13.0 mm | 70 HD |
| (5) | 0.55 mm | 0.81 mm | 0.085% | 0.12% | 13.5 mm | 68 HD |
| (6) | 0.60 mm | 0.78 mm | 0.09% | 0.15% | 14.6 mm | 67 HD |
| (7) | 1.5 mm | 2.0 mm | 0.18% | 0.35% | 16.0 mm | 63 HD |

From the above test results of the performances, it may be seen that the plasticizer including epoxy groups in the 323.45 parts by weight of the first structural layer 141 may be set to 10-20 parts by weight, so that the warpage at room temperature, the thermal warpage, the thermal dimensional change rate, the low-temperature dimensional change rate, the fracture resistance elongation displacement, and the hardness of the elastic layer of the composite decorative board 100 may be excellent. When the parts by weight of the plasticizer are within a range of 10-20, with an increasing use of the plasticizer, the warpage at room temperature, the thermal dimensional change rate, the low-temperature dimensional change rate, and the fracture resistance elongation displacement of the composite decorative board 100 showed a trend of increasing, the thermal warpage of the composite decorative board 100 showed a trend of increasing first and then decreasing, and the hardness of the elastic layer of the composite decorative board 100 showed a trend of decreasing.

In some embodiments, the mass per unit area of the primer coating layer and the surface coating layer in the UV coating layer 110 may directly affect the adhesion, a Martindale gloss retention, and a glossiness of the composite decorative board 100. Therefore, the primer coating layer and the surface coating layer of different masses per unit area in the UV coating layer 110 may have different effects on the performance of the composite decorative board 100. Specifically, the specific effects of the primer coating layer and the surface coating layer of different masses per unit area on the performance of the composite decorative board 100 may be reflected by the following plurality of sets of test results of performances.

In this embodiment, the test results may include performances of the composite decorative board 100 in terms of a deep scratch resistance, a Martindale RTS, a Martindale gloss retention, an adhesion, a high-gloss glossiness, a medium-gloss glossiness, and a skin-feel glossiness. As used herein, the deep scratch resistance refers to a maximum weight of the scratch resistance of a coating when different weights are applied on the coating using a scratch machine with a tungsten-tib of 0.5 millimeters. The adhesion refers to a mutual attraction between surface molecules when two different substances are in contact. The Martindale RTS (Martindale wear-resistance test) refers to an ability of the scratch resistance of a coating when the coating is scratched 50 times with a 7447C scouring pad under a load of 8.4 lb. The Martindale gloss retention refers to an ability of a coating to maintain an original gloss after being scratched 80 times with 7440B baggage under a load of 4 N. The glossiness refers to a strength of the capability that a surface of a material reflects light.

In the plurality of sets of experiments, the structure and components of the composite decorative board 100 except for the UV coating layer 110 may be set to be the same. For example, the components of the first structural layer 141 included 100 parts by weight of polyvinyl chloride, 250 parts by weight of calcium carbonate, 0.3 parts by weight of polyethylene wax, 4 parts by weight of a stabilizer (calcium stearate), 10 parts by weight of a plasticizer (epoxy linseed oil), and 0.4 parts by weight of carbon black. The components of the second structural layer 142 included 100 parts by weight of polyvinyl chloride, 350 parts by weight of calcium carbonate, 1.3 parts by weight of polyethylene wax, 6 parts by weight of a stabilizer, 1.4 parts by weight of stearic acid, and 6 parts by weight of a forming agent of acrylate resin coordinating a metal ion. Only the masses per unit area of the primer coating layer and the surface coating layer in the UV coating layer 110 were set as variables.

Specifically, the mass per unit area of the primer coating layer and the mass per unit area of the surface coating layer in the UV coating layer 110 were set as the following thirteen situations.

(1) The mass per unit area of the primer coating layer in the UV coating layer 110 was 10 g/m$^2$, and the mass per unit area of the surface coating layer in the UV coating layer 110 was 60 g/m$^2$.

(2) The mass per unit area of the primer coating layer in the UV coating layer 110 was 10 g/m$^2$, and the mass per unit area of the surface coating layer in the UV coating layer 110 was 65 g/m$^2$.

(3) The mass per unit area of the primer coating layer in the UV coating layer 110 was 10 g/m$^2$, and the mass per unit area of the surface coating layer in the UV coating layer 110 was 70 g/m$^2$.

(4) The mass per unit area of the primer coating layer in the UV coating layer 110 was 10 g/m$^2$, and the mass per unit area of the surface coating layer in the UV coating layer 110 was 55 g/m$^2$.

(5) The mass per unit area of the primer coating layer in the UV coating layer 110 was 10 g/m², and the mass per unit area of the surface coating layer in the UV coating layer 110 was 75 g/m².
(6) The mass per unit area of the primer coating layer in the UV coating layer 110 was 12.5 g/m², and the mass per unit area of the surface coating layer in the UV coating layer 110 was 60 g/m².
(7) The mass per unit area of the primer coating layer in the UV coating layer 110 was 12.5 g/m², and the mass per unit area of the surface coating layer in the UV coating layer 110 was 65 g/m².
(8) The mass per unit area of the primer coating layer in the UV coating layer 110 was 12.5 g/m², and the mass per unit area of the surface coating layer in the UV coating layer 110 was 70 g/m².
(9) The mass per unit area of the primer coating layer in the UV coating layer 110 was 15 g/m², and the mass per unit area of the surface coating layer in the UV coating layer 110 was 60 g/m².
(10) The mass per unit area of the primer coating layer in the UV coating layer 110 was 15 g/m², and the mass per unit area of the surface coating layer in the UV coating layer 110 was 65 g/m².
(11) The mass per unit area of the primer coating layer in the UV coating layer 110 was 15 g/m², and the mass per unit area of the surface coating layer in the UV coating layer 110 was 70 g/m².
(12) The mass per unit area of the primer coating layer in the UV coating layer 110 was 15 g/m², and the mass per unit area of the surface coating layer in the UV coating layer 110 was 55 g/m².
(13) The mass per unit area of the primer coating layer in the UV coating layer 110 was 15 g/m², and the mass per unit area of the surface coating layer in the UV coating layer 110 was 75 g/m².

In the above thirteen examples, performances of the composite decorative board 100 were tested in terms of the deep scratch resistance, the Martindale RTS, the Martindale gloss retention, the adhesion (ISO 10582), the high-gloss glossiness, the medium-gloss glossiness, the skin-feel glossiness, the thermal dimensional change rate, and the thermal warpage. The following test results (Table 2) were obtained.

According to the above test results, when the mass per unit area of the surface coating layer is 60-70 g/m² and the mass per unit area of the primer coating layer is 10-15 g/m², the high-gloss decorative board, the medium-gloss decorative board, and the skin-feel decorative board may satisfy requirements (the deep scratch resistance, the Martindale RTS, the Martindale gloss retention, the adhesion, the glossiness, the thermal dimensional change rate, and the thermal warpage) of the corresponding composite decorative board.

In some embodiments, a thickness of a surface cured film may affect the glossiness and the Martindale gloss retention of the composite decorative board 100. Therefore, surface cured films of different thicknesses may have different effects on the performances of the composite decorative board 100. Specifically, the specific effects of the surface cured films of different thicknesses on the performances of the composite decorative board 100 may be reflected by the following plurality of sets of test results of performances.

In this embodiment, the test results may include performances of the composite decorative board 100 in terms of a Martindale gloss retention and a glossiness. The specific details regarding the glossiness and the Martindale gloss retention may be referred to the above descriptions, which are not repeated here.

As mentioned above, the composite decorative board 100 may include a high-gloss decorative board, a medium-gloss decorative board, or a skin-feel decorative board. The surface cured film may include a high-gloss film, a medium-gloss film, or a skin-feel film. Merely by way of example, in the plurality of sets of experiments, the structure and components in the composite decorative board 100 except for the surface cured film may be set to be the same. For example, the components of the first structural layer 141 included 100 parts by weight of polyvinyl chloride, 250 parts by weight of calcium carbonate, 0.3 parts by weight of polyethylene wax, 4 parts by weight of a stabilizer (calcium stearate), 10 parts by weight of a plasticizer (epoxy linseed oil), and 0.4 parts by weight of carbon black. The components of the second structural layer 142 included 100 parts by weight of polyvinyl chloride, 350 parts by weight of calcium carbonate, 1.3 parts by weight of polyethylene wax, 6 parts by weight of a stabilizer, 1.4 parts by weight of stearic acid, and 6 parts by weight of a forming agent of acrylate resin

TABLE 2

Effects of masses per unit area of the primer coating layer and the surface coating layer in the UV coating layer of the composite decorative board 100 on the performance

| | Deep scratch resistance (N)⩾5N | Martindale RTS/ ⩽4 level | Martindale gloss retention/ ⩽10% | Adhesion/ ⩽2 level | High-gloss glossiness/ 80°-90° | Medium-gloss glossiness/ 40°-55° | Skin-feel glossiness/ 0°-5° | Thermal dimensional change rate/ ⩽0.25% | Theramal warpage/ ⩽2.0 mm |
|---|---|---|---|---|---|---|---|---|---|
| (1) | 8 | 4 level | 9% | 2 level | 85° | 50° | 2.0° | 0.08% | 0.50 mm |
| (2) | 10 | 3 level | 6% | 2 level | 83° | 48° | 1.5° | 0.091% | 0.52 mm |
| (3) | 12 | 2 level | 5% | 2 level | 82° | 46° | 1.4° | 0.13% | 0.60 mm |
| (4) | 4 | 5 level | 11% | 2 level | 85° | 50° | 2.2° | 0.083% | 0.51mm |
| (5) | 4 | 5 level | 12% | 4 level | 84° | 49° | 2.5° | 0.27% | 2.5 mm |
| (6) | 8 | 4 level | 9% | 1 level | 82° | 46° | 1.4° | 0.092% | 0.61 mm |
| (7) | 10 | 4 level | 6% | 1 level | 83° | 46° | 1.5° | 0.100% | 0.65 mm |
| (8) | 10 | 4 level | 5% | 1 level | 82° | 45° | 1.4° | 0.120% | 0.80 mm |
| (9) | 8 | 4 level | 9% | 1 level | 81° | 45° | 1.3° | 0.102% | 0.65 mm |
| (10) | 12 | 3 level | 5% | 1 level | 83° | 44° | 1.2° | 0.125% | 0.80 mm |
| (11) | 12 | 2 level | 4% | 1 level | 82° | 43° | 1.3° | 0.130% | 1.0 mm |
| (12) | 4 | 5 level | 12% | 2 level | 84° | 45° | 1.4° | 0.12% | 1.0 mm |
| (13) | 5 | 5 level | 11% | 4 level | 84° | 49° | 2.5° | 0.30% | 2.5 mm | coordinating a metal ion. Only the thickness of the surface cured film was determined as a single variable.

Specifically, the surface cured film was set as the following fifteen situations.

(1) A luminosity of the high-gloss film was 90 degrees, and a thickness of the high-gloss film was 80 micrometers.
(2) The luminosity of the high-gloss film was 90 degrees, and the thickness of the high-gloss film was 65 micrometers.
(3) The luminosity of the high-gloss film was 90 degrees, and the thickness of the high-gloss film was 50 micrometers.
(4) The luminosity of the high-gloss film was 90 degrees, and the thickness of the high-gloss film was 35 micrometers.
(5) The luminosity of the high-gloss film was 90 degrees, and the thickness of the high-gloss film was 25 micrometers.
(6) A luminosity of the medium-gloss film was 55 degrees, and a thickness of the medium-gloss film was 80 micrometers.
(7) The luminosity of the medium-gloss film was 55 degrees, and the thickness of the medium-gloss film was 65 micrometers.
(8) The luminosity of the medium-gloss film was 55 degrees, and the thickness of the medium-gloss film was 50 micrometers.
(9) The luminosity of the medium-gloss film was 55 degrees, and the thickness of the medium-gloss film was 38 micrometers.
(10) The luminosity of the medium-gloss film was 55 degrees, and the thickness of the medium-gloss film was 25 micrometers.
(11) A luminosity of the skin-feel film was 5 degrees, and a thickness of the skin-feel film was 25 micrometers.
(12) The luminosity of the skin-feel film was 5 degrees, and the thickness of the skin-feel film was 38 micrometers.
(13) The luminosity of the skin-feel film was 5 degrees, and the thickness of the skin-feel film was 50 micrometers.
(14) The luminosity of the skin-feel film was 5 degrees, and the thickness of the skin-feel film was 65 micrometers.
(15) The luminosity of the skin-feel film was 5 degrees, and the thickness of the skin-feel film was 80 micrometers.

In the above fifteen examples, performances of the composite decorative board 100 were tested in terms of the Martindale gloss retention and the glossiness. The following test results (Table 3) were obtained.

TABLE 3

Performances of the composite decorative board 100 corresponding to different thicknesses of surface cured films

| Serial number | Martindale gloss retention/≤ 10% | Glossiness |
|---|---|---|
| (1) | 6.5% | 85° |
| (2) | 7.2% | 80° |
| (3) | 7.3% | 80° |
| (4) | 7.5% | 79° |
| (5) | 7.8% | 78° |
| (6) | 8.0% | 53° |
| (7) | 9% | 53° |
| (8) | 7.5% | 50° |
| (9) | 8.0% | 45° |
| (10) | 8.2% | 43° |
| (11) | 8.0% | 2° |
| (12) | 8.3% | 2.3° |
| (13) | 8.5% | 2.5° |
| (14) | 8.0% | 2.7° |
| (15) | 8.6% | 2.9° |

According to the above test results, it may be seen that when the thickness of the surface cured film (e.g., the high-gloss film, the medium-gloss film, or the skin-feel film) is 25-80 micrometers, the high-gloss decorative board, the medium-gloss decorative board, and the skin-feel decorative board may all satisfy requirements (the Martindale gloss retention and the glossiness) of the corresponding composite decorative board 100.

In some embodiments, the thickness of the wear-resistant layer 120 may affect various performances of the composite decorative board 100, for example, the warpage at room temperature, the thermal warpage, the thermal dimensional change rate, the low-temperature dimensional change rate, etc. More details regarding these performances may be referred to the above descriptions, which are not repeated here.

In this embodiment, the test results may include performances of the deep scratch resistance, the Martindale RTS, the Martindale gloss retention, the adhesion, the high-gloss glossiness, the medium-gloss glossiness, and the skin-feel glossiness of the composite decorative board 100.

In the plurality of sets of experiments, the components of the second structural layer 142 in each set of the corresponding composite decorative board 100 may be set to be the same. For example, the components of 464.7 parts by weight of the second structural layer 142 in the composite decorative board 100 may be set to 100 parts by weight of polyvinyl chloride, 350 parts by weight of calcium carbonate, 1.3 parts by weight of polyethylene wax, 6 parts by weight of a stabilizer (calcium stearate), 1.4 parts by weight of stearic acid, and 6 parts by weight of a forming agent of acrylate resin coordinating a metal ion.

At the same time, the thickness of the wear-resistant layer 120 and the components of the first structural layer 141 may be set as the following nine situations.

(1) The thickness of the wear-resistant layer 120 was 0.15 millimeters. The components of the first structural layer 141 included 100 parts by weight of polyvinyl chloride, 250 parts by weight of calcium carbonate, 0.3 parts by weight of polyethylene wax, 4 parts by weight of a stabilizer (calcium stearate), 15 parts by weight of a plasticizer (epoxy linseed oil), and 0.4 parts by weight of carbon black.

(2) The thickness of the wear-resistant layer 120 was 0.45 millimeters. The components of the first structural layer 141 included 100 parts by weight of polyvinyl chloride, 250 parts by weight of calcium carbonate, 0.3 parts by weight of polyethylene wax, 4 parts by weight of a stabilizer (calcium stearate), 15 parts by weight of a plasticizer (epoxy linseed oil), and 0.4 parts by weight of carbon black.

(3) The thickness of the wear-resistant layer 120 was 0.50 millimeters. The components of the first structural layer 141 included 100 parts by weight of polyvinyl chloride, 250 parts by weight of calcium carbonate, 0.3 parts by weight of polyethylene wax, 4 parts by weight of a stabilizer (calcium stearate), 15 parts by weight of a plasticizer (epoxy linseed oil), and 0.4 parts by weight of carbon black.

(4) The thickness of the wear-resistant layer 120 was 0.60 millimeters. The components of the first structural layer 141 included 100 parts by weight of polyvinyl chloride, 250 parts by weight of calcium carbonate, 0.3 parts by weight of polyethylene wax, 4 parts by weight of a stabilizer (calcium stearate), 15 parts by weight of a plasticizer (epoxy linseed oil), and 0.4 parts by weight of carbon black.

(5) The thickness of the wear-resistant layer 120 was 0.50 millimeters. The components of the first structural layer 141 included 100 parts by weight of polyvinyl chloride, 225 parts by weight of calcium carbonate, 0.3 parts by weight of polyethylene wax, 4 parts by weight of a stabilizer, 15 parts by weight of a plasticizer, and 0.4 parts by weight of carbon black.

(6) The thickness of the wear-resistant layer 120 was 0.50 millimeters. The components of the first structural layer 141 included 100 parts by weight of polyvinyl chloride, 200 parts by weight of calcium carbonate, 0.3 parts by weight of polyethylene wax, 4 parts by weight of a stabilizer, 15 parts by weight of a plasticizer, and 0.4 parts by weight of carbon black.

(7) The thickness of the wear-resistant layer 120 was 0.50 millimeters. The components of the first structural layer 141 included 100 parts of weight of polyvinyl chloride, 150 parts by weight of calcium carbonate, 0.3 parts by weight of polyethylene wax, 4 parts by weight of a stabilizer, 15 parts by weight of a plasticizer, and 0.4 parts by weight of carbon black.

(8) The thickness of the wear-resistant layer 120 was 0.50 millimeters. The components of the first structural layer 141 included 100 parts by weight of polyvinyl chloride, 300 parts by weight of calcium carbonate, 0.3 parts by weight of polyethylene wax, 4 parts by weight of a stabilizer, 15 parts by weight of a plasticizer, and 0.4 parts by weight of carbon black.

(9) The thickness of the wear-resistant layer 120 was 0.30 millimeters. The components of the first structural layer 141 included 100 parts by weight of polyvinyl chloride, 225 parts by weight of calcium carbonate, 0.3 parts by weight of polyethylene wax, 4 parts by weight of a stabilizer, 15 parts by weight of a plasticizer, and 0.4 parts by weight of carbon black.

In the case that the components of the second structural layer 142 are the same, using the components of the first structural layer 141 corresponding to the above nine thicknesses of the wear-resistant layer 120, the following test results of performances of the warpage at room temperature, the thermal warpage, the thermal dimensional change rate, and the low-temperature dimensional change rate of the composite decorative board 100 may be obtained.

TABLE 4

Performances corresponding to different thicknesses of the wear-resistant layer 120 in the composite decorative board 100

| Number | Warpage at room temperature/ 23 ± 2° C. | Thermal warpage/ 80° C. | Thermal dimensional change rate/ 80° C. | Low-temperature resistance dimensional change rate/ −18° C. |
| --- | --- | --- | --- | --- |
| (1) | 0.45 mm | 0.60 mm | 0.08% | 0.073% |
| (2) | 1.0 mm | 1.1 mm | 0.18% | 0.20% |
| (3) | 1.50 mm | 2.10 mm | 0.22% | 0.32% |
| (4) | 1.6 mm | 2.15 mm | 0.25% | 0.33% |
| (5) | 1.30 mm | 2.20 mm | 0.20% | 0.24% |
| (6) | 0.50 mm | 0.70 mm | 0.068% | 0.10% |
| (7) | 1.0 mm | 2.5 mm | 0.24% | 0.35% |
| (8) | 1.5 mm | 2.0 mm | 0.26% | 0.30% |
| (9) | 0.4 mm | 0.65 mm | 0.085% | 0.085% |

According to the test results of performances of the sets (1), (2), (3), (4), the thickness of the wear-resistant layer 120 may affect performances (the warpage at room temperature, the thermal warpage, the thermal dimensional change rate, the low-temperature dimensional change rate, etc.) of the composite decorative board 100. With an increase of the thickness of the wear-resistant layer 120, the warpage at room temperature, the thermal warpage, the thermal dimensional change rate, the low-temperature dimensional change rate of the composite decorative board 100 may increase. An overall performance of the composite decorative board 100 may degrade. When the components of the first structural layer 141 include 100 parts by weight of the polyvinyl chloride, 250 parts by weight of the calcium carbonate, 0.3 parts by weight of the polyethylene wax, 4 parts by weight of the stabilizer (calcium stearate), 15 parts by weight of the plasticizer (epoxy linseed oil), and 0.4 parts by weight of the carbon black, the thickness of the wear-resistant layer 120 may optionally be set to be 0.15-0.45 millimeters.

From the test results of performances of the sets (5) and (9), when the components of the first structural layer 141 include 100 parts by weight of the polyvinyl chloride, 225 parts by weight of the calcium carbonate, 0.3 parts by weight of the polyethylene wax, 4 parts by weight of the stabilizer (calcium stearate), 15 parts by weight of the plasticizer (epoxy linseed oil), and 0.4 parts by weight of the carbon black, the thickness of the wear-resistant layer 120 may optionally be 0.30 millimeters.

At the same time, according to the above sets (3), (5) and (6), (7), (8), when the thickness of the wear-resistant layer 120 is the same and contents of the calcium carbonate are different, the warpage at room temperature, the thermal warpage, the thermal dimensional change rate, and the low-temperature dimensional change rate of the composite decorative board 100 may be different. When the thickness of the wear-resistant layer 120 is 0.5 millimeters, an overall performance of the first structural layer 141 in the set (6) of experiments may be better. Therefore, the contents of the calcium carbonate may affect the performances (the warpage at room temperature, the thermal warpage, the thermal dimensional change rate, the low-temperature dimensional change rate, etc.) of the composite decorative board 100. When the thickness of the wear-resistant layer 120 is 0.5 millimeters, the components of the first structural layer 141 may optionally include 100 parts by weight of the polyvinyl chloride, 200 parts by weight of the calcium carbonate, 0.3 parts by weight of the polyethylene wax, 4 parts by weight of the stabilizer (calcium stearate), 15 parts by weight of the plasticizer (epoxy linseed oil), and 0.4 parts by weight of the carbon black.

Figure 3:
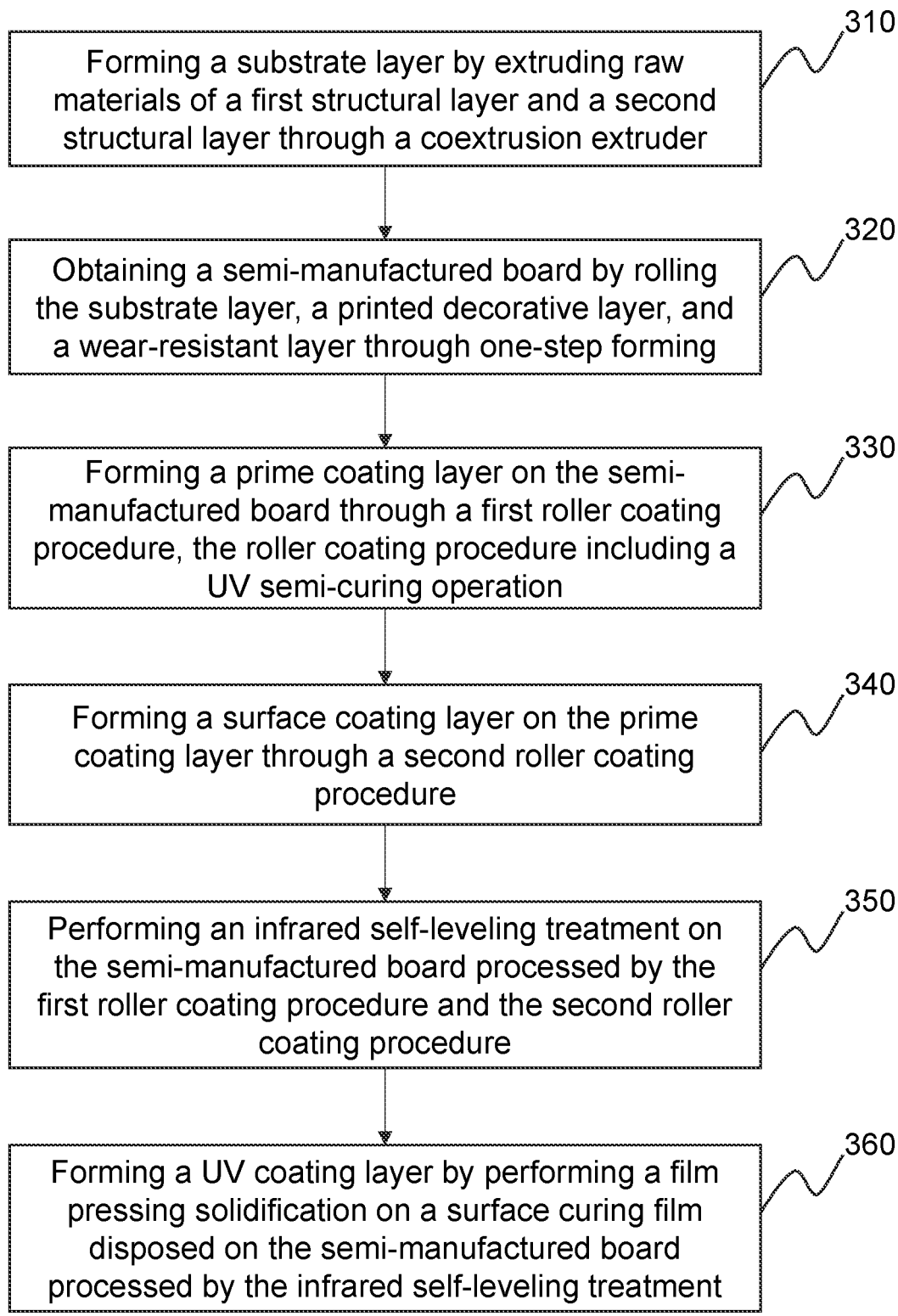
FIG. 3 is a flowchart illustrating an exemplary method for manufacturing a composite decorative board according to some embodiments of the present disclosure.

FIG. 3 is a flowchart illustrating an exemplary manufacturing method of a composite decorative board according to some embodiments of the present disclosure. Merely for illustration purposes, as shown in FIG. 3, the manufacturing method 300 of the composite structure decorative board 100 may include the following operations.

In 310, a substrate layer may be extruded by extruding raw materials of a first structural layer and a second structural layer through a coextrusion extruder.

In some embodiments, the raw materials of the first structural layer 141 and the raw materials of the second structural layer 142 may be materials of components of the first structural layer 141 and components of the second structural layer 142, respectively. More descriptions regarding the raw materials of the first structural layer and the raw materials of the second structural layer may be found in FIG. 1 and the descriptions thereof, which may not be repeated herein.

In some embodiments, the substrate layer refers to a bottom board used to manufacture the composite decorative board 100. The co-extrusion extruder refers to a device that forms a mold body having a cross-section similar to a shape of an extrusion mold by sending raw materials in a viscous state after heating through the extrusion mold. The viscous state refers to a mechanical state of an amorphous polymer under high temperature and large external force for a long time. In some embodiments, the co-extrusion extruder may include a main extruder, a co-extruder, a feeding device, a programmable logic controller (PLC) control system, a distributor, and a mold with a channel having a certain cross-sectional shape. The feeding device may be disposed on the main extruder. The main extruder and the distributor may be connected by a confluence core channel. The co-extruder and the distributor may be connected through the confluence core channel. The distributor may be connected to the mold. The PLC control system may be used to control operations of the co-extrusion extruder and supporting devices of the co-extrusion extruder. In some embodiments, the co-extrusion extruder used in the embodiments of the present disclosure may be an existing co-extrusion extruder on the market, and is not repeated here.

In some embodiments, the extruding the substrate layer by extruding raw materials of the first structural layer and the second structural layer through a coextrusion extruder may include one or more of the following operations. The raw materials of the first structural layer 141 may be pretreated and poured into the main extruder and the co-extruder. The raw materials of the first structural layer 141 may be plasticized and extruded to the distributor. The distributor may extrude the raw materials of the first structural layer 141 to the mold. The raw materials of the second structural layer 142 may be pretreated and poured into the main extruder and the co-extruder. The raw materials of the second structural layer 142 may be plasticized and extruded to the distributor. The distributor may extrude the raw materials of the second structural layer 142 to the same mold. Finally, the materials may be extruded in the mold to form the substrate layer.

In some embodiments, the raw materials of the first structural layer 141 may include polyvinyl chloride and a plasticizer. Correspondingly, the pretreatment of the first structural layer 141 may include obtaining a first ingredient by stirring and heating the polyvinyl chloride and the plasticizer to a first preset temperature, mixing the rest of the raw materials of the first structural layer 141, stirring and heating the mixture to a second preset temperature, and cooling the mixture from the second preset temperature to a third preset temperature. In some embodiments, the rest of the raw materials of the first structural layer 141 may include calcium carbonate, polyethylene wax, at least one stabilizer, at least one colorant, or the like.

In some embodiments, the first preset temperature may be within a range of 60-80° C. In some embodiments, the first preset temperature may be within a range of 62-78° C. In some embodiments, the first preset temperature may be within a range of 64-76° C. In some embodiments, the first preset temperature may be within a range of 66-74° C. In some embodiments, the first preset temperature may be within a range of 68-72° C. In some embodiments, the first preset temperature may be 70° C.

In some embodiments, the second preset temperature may be within a range of 80-100° C. In some embodiments, the second preset temperature may be within a range of 82-98° C. In some embodiments, the second preset temperature may be within a range of 84-96° C. In some embodiments, the second preset temperature may be within a range of 86-94° C. In some embodiments, the second preset temperature may be within a range of 88-92° C. In some embodiments, the second preset temperature may be 90° C.

In some embodiments, the third preset temperature may be within a range of 40-60° C. In some embodiments, the third preset temperature may be within a range of 42-58° C. In some embodiments, the third preset temperature may be within a range of 44-56° C. In some embodiments, the third preset temperature may be within a range of 46-54° C. In some embodiments, the third preset temperature may be within a range of 48-52° C. In some embodiments, the third preset temperature may be 50° C.

More descriptions regarding the polyvinyl chloride and the plasticizer may be found in FIG. 1 and the descriptions thereof, which are not repeated here.

In some embodiments, the polyvinyl chloride and the plasticizer may be put into a mixer according to a preset ratio for heating up. The preset ratio refers to a ratio of components calculated in advance according to physical properties of the composite decorative board 100. For example, the preset ratio of the polyvinyl chloride and the plasticizer may be determined based on 95 parts by weight of the polyvinyl chloride and 13 parts by weight of the plasticizer.

In some embodiments, as for 323.45 parts by weight of the first structural layer 141, a ratio of the rest of the raw materials of the first structural layer 141 may include 200-250 parts by weight of the calcium carbonate, 0.1-0.3 parts by weight of the polyethylene wax, 2-4 parts by weight of the stabilizer, and 0.1-0.4 parts by weight of the colorant.

The first ingredient may be a material obtained by uniformly mixing the raw materials of the first structural layer 141. That is, the polyvinyl chloride and the plasticizer may be stirred and heated to the first preset temperature, and then the rest of the raw materials of the first structural layer 141 may be poured thereinto. The mixture may be stirred and heated to the second preset temperature. The first ingredient may be obtained after the mixture is cooled to the third preset temperature. The above method may not only mix the raw materials amply and uniformly, but also avoid a volatilization and decomposition of the raw materials of the first structural layer 141, thereby ensuring an excellent performance of the first structural layer 141.

In some embodiments, forming the second structural layer 142 may include obtaining a second ingredient by stirring and heating the raw materials of the second structural layer to a fourth preset temperature, and cooling the raw materials of the second structural layer from the fourth preset temperature to a fifth preset temperature.

In some embodiments, the fourth preset temperature may be within a range of 110-140° C. In some embodiments, the fourth preset temperature may be within a range of 115-135° C. In some embodiments, the fourth preset temperature may be within a range of 120-130° C. In some embodiments, the fourth preset temperature may be 125° C.

In some embodiments, the fifth preset temperature may be within a range of 40-60° C. In some embodiments, the fifth preset temperature may be within a range of 42-58° C. In some embodiments, the fifth preset temperature may be within a range of 44-56° C. In some embodiments, the fifth preset temperature may be within a range of 46-54° C. In some embodiments, the fifth preset temperature may be within a range of 48-52° C. In some embodiments, the fifth preset temperature may be 50° C.

In some embodiments, the pretreating the raw materials of the second structural layer 142 may further include putting the raw materials into a high-speed mixer through an automatic metering system according to a distribution ratio of components. In some embodiments, as for 464.7 parts by weight of the second structural layer 142, the distribution ratio of components of the second structural layer 142 may include 90-110 parts by weight of polyvinyl chloride, 300-400 parts by weight of calcium carbonate, and 1.0-1.6 parts by weight of polyethylene wax, 5-7 parts by weight of at least one stabilizer, 1.1-1.7 parts by weight of stearic acid, and 5-7 parts by weight of a forming agent of acrylate resin coordinating a metal ion.

The second ingredient may be an ingredient obtained by uniformly mixing the raw materials of the second structural layer 142. For example, the second ingredient may be obtained by stirring and heating the raw materials of the second structural layer 142 to the fourth preset temperature, and cooling the raw materials of the second structural layer 142 from the fourth preset temperature to the fifth preset temperature. The above method may not only mix the raw materials amply and uniformly, but also avoid a volatilization and decomposition of the components, thereby ensuring an excellent performance of the second structural layer 142.

In some embodiments, a semi-manufactured board may be obtained based on the substrate layer, the printed decorative layer 130, and the wear-resistant layer 120 through forming techniques. The semi-manufactured board may be coated with oil paint using a coating technique. The UV coating layer 110 may be formed by performing a film pressing solidification on a surface cured film and the semi-manufactured board to obtain the final composite decorative board 100. More descriptions regarding forming the UV coating layer 110 may be found in operation 360 and the descriptions thereof, which are not repeated here.

In some embodiments, the molding technique may include a compression molding technique, a calendering molding technique, or the like. The compression molding technique refers to a technique that melts a solid material to be molded into a fluid at a high temperature and cools the material to form a molded product with a same shape as the mold. The calendering molding technique refers to a technique that applies a pressure to a material using a roller to stretch the material to obtain a product. In some embodiments, the coating technique may include a dip coating technique, a roll coating technique, or the like. The dip coating technique refers to a technique of immersing a whole object to be coated in a coating solution to achieve coating of the object to be coated. The roll coating technique refers to a technique that uses rollers to transfer paint onto an object being coated.

In 320, the semi-manufactured board may be obtained by rolling the substrate layer, the printed decorative layer, and the wear-resistant layer through one-step forming.

More descriptions regarding the printed decorative board 130 and the wear-resistant layer 120 may be found in FIG. 1 and the descriptions thereof, which are not repeated here. In some embodiments, the semi-manufactured board refers to an intermediate product that has been partially processed but has not yet been made into the final composite decorative board 100.

In some embodiments, the rolling refers to applying a pressure to a material with a roller to cause the material to stretch. For example, plasticized thermoplastic under a temperature close to the temperature of the viscous state may transferred through a series of gaps of horizontal rollers oppositely rotating. Therefore, the plasticized thermoplastic may be subjected to squeezing and stretching to become a sheet-like semi-manufactured board or manufactured board with a certain thickness, width, and surface smoothness. The viscous state refers to a mechanical state of an amorphous polymer under high temperature and large external force for a long time.

In some embodiments, a semi-manufactured board through one-step forming may be obtained by rolling the substrate layer, the printed decorative layer, and the wear-resistant layer using rollers to apply the pressure on the materials to cause the materials to stretch. For example, plasticized thermoplastic under a temperature close to the temperature of the viscous state may be transferred through a series of gaps of horizontal rollers oppositely rotating. Therefore, the material may be subjected to squeezing and stretching to one-step form a sheet-like semi-manufactured board with a certain thickness, width, and surface smoothness.

In 330, a prime coating layer may be formed on the semi-manufactured board through a first roller coating procedure.

In some embodiments, before the semi-manufactured board is performed the first roller coating procedure, the semi-manufactured board may need to be pretreated. In some implementations, the pretreatment may include light sanding, electrostatic dust removal, and primer coating after preheating a surface of the semi-manufactured board. The light sanding refers to a process of cleaning the rest of sticky sand on a mold blank. The electrostatic dust removal refers to a dust collection manner that uses an electrostatic field to ionize gas so that dust particles are charged and adsorbed on the electrode. In some embodiments, the first roller coating procedure may include operations of a first coating using a roller and a UV semi-curing.

In some embodiments, the first roller coating procedure refers to a procedure of coating a primer on a surface of an object by using a rotating roller. The primer refers to a paint that is applied to the surface of the object under some other substances. For example, a roller is used as a carrier of the primer. The primer may form a wet film of a certain thickness on a surface of the roller. The roller may contact with an object to be coated during a rotation to coat the primer on a surface of the object.

The rotating roller may include a cylindrically rotatable component. A set of rotating rollers may consist of one or more rollers. In some embodiments, the rotating roller and the set of rotating rollers composed of the rotating rollers may be used to perform one or more functions, such as roller painting, calendaring, printing, cooling, or the like, or any combination thereof.

In some embodiments, the UV semi-curing operation refers to a manner using radiation curing to make the substances coated on the surface of the object in a semi-solidified state.

In 340, a surface coating layer may be formed on the prime coating layer through a second roller coating procedure.

In some embodiments, the second roller coating procedure may include rolling a first surface coating on the surface of the semi-manufactured board through a forward set of rollers, and rolling a second surface coating on the surface of the semi-manufactured board through a reverse set of rollers.

In some embodiments, rolling the first surface coating refers to using a roller to transfer the first surface coating onto the object to be coated. For example, using a roller as a carrier of the first surface coating, the first surface coating may form a wet film of a certain thickness on the surface of the roller, and the first surface coating may contact with the object during rotation of the roller. The first surface coating may be coated to a surface of the primer coating layer of the object to be coated. In some embodiments, rolling the second surface coating refers to transferring the second surface coating onto the object to be coated with a roller. In some embodiments, the first surface coating and the second surface coating may be the same or different.

The embodiments of the present disclosure adopt the procedure of the forward and reverse rollers coating UV paint and the UV film pressing technique to effectively solve problems (stack paint on a paint film of the board surface, bubbles of the paint film, scratch resistance, and non-wear resistance) of the composite decorative board 100, thereby obtaining a flat, scratch-resistant, and a high-definition high-gloss of the surface of the composite decorative board 100. Compared with the existing ceramic tiles, the composite decorative board 100 may have a better compression resistance and slip resistance, and a lower product density.

In 350, an infrared self-leveling treatment may be performed on the semi-manufactured board processed by the first roller coating procedure and the second roller coating procedure.

The infrared self-leveling treatment refers to an operation using infrared rays to irradiate the surface of the semi-manufactured board after the second roller coating procedure. The infrared self-leveling treatment may be used for the leveling and defoaming of the coating to make the surface of the board smoother. The infrared self-leveling treatment may use a principle of infrared heating to speed up a volatilization of a paint thinner and a reaction of the paint. Therefore, a drying time of the paint may be shortened.

In some embodiments, an infrared leveling machine may be used to perform the infrared self-leveling treatment on the surface of the semi-manufactured board after the second roller coating procedure. In some embodiments, a length of the infrared leveling machine may be 6-12 meters. In some embodiments, the length of the infrared leveling machine may be 7-11 meters. In some embodiments, the length of the infrared leveling machine may be 8-10 meters. In some embodiments, the length of the infrared leveling machine may be 9 meters. When the length of the infrared leveling machine is within the above range, it may be good to smooth the paint surface and be no stack paint. A heating temperature of the infrared self-leveling treatment may be 50-80° C. In some embodiments, the heating temperature of infrared self-leveling treatment may be 55-75° C. In some embodiments, the heating temperature of infrared self-leveling treatment may be 60-70° C. In some embodiments, the heating temperature of infrared self-leveling treatment may be 65° C. When the heating temperature of the infrared self-leveling treatment is within the above range, it may not only ensure that components of the paint are not destroyed, but also achieve expected effects of leveling, defoaming, and shortening the drying time.

In 360, a UV coating layer may be formed by performing a film pressing solidification on a surface cured film disposed on the semi-manufactured board processed by the infrared self-leveling treatment.

The surface cured film may be a polyester film that controls a surface effect when the surface coating is curing to improve the surface performance of the composite decorative board 100. For example, the surface cured film may be used to control a glossiness of 60-degrees angle on the surface of the composite decorative board 100. As another example, the surface cured film may be used to improve a printing adaptability. As still another example, the surface cured film may be used to improve an antistatic performance. As another example, the surface cured film may be used to improve hydrophilicity.

In some embodiments, the surface cured film may include a high-gloss film, a medium-gloss film, and a skin-feel film. As used herein, the gloss film or the medium-gloss film may be a PET polyester film. The skin-feel film may be a skin-feel film of macromolecule polyester.

The UV coating layer 110 may be a curing coating layer coated on the wear-resistant layer. In some embodiments, the UV coating layer 110 may at least include one of the primer coating layer and the surface coating layer. According to the effect, different UV coatings layers 110 may form different gloss levels. For example, the UV coating layer 110 with a high-gloss effect may generate a high-gloss effect. That is, the glossiness of 60-degrees angle on the surface of the composite decorative board 100 may be 70-100°.

In some embodiments, the composite decorative board 100 may include a high-gloss decorative board, a medium-gloss decorative board, and a skin-feel decorative board, which correspond to showing gloss effects of a high-gloss surface, a medium-gloss surface, and a skin-feel surface, respectively.

In some embodiments, when the composite decorative board 100 has a high-gloss or medium-gloss effect, the surface cured film may be a PET polyester film. In some embodiments, a thickness of the single-sided coating of the PET polyester film may be 80-100 micrometers. When the thickness of the single-sided coating of the PET polyester film is within the thickness range, the surface cured film may effectively control the surface glossiness and touch of the composite decorative board 100 when cooperating with other UV layers. The PET polyester film may include a polyethylene terephthalate film. By setting the surface cured film as a PET polyester film when the composite decorative board 100 has a high-gloss or medium-gloss effect, a glossiness of 60-degrees angle on the surface of the composite decorative board 100 may be 30-70° or 70-100°. In some embodiments, when the medium-gloss effect is formed, after the film pressing solidification, a second roller coating procedure may be performed to form a glossiness of 60-degrees angle on the surface of the composite decorative board 100 to be 30-70°.

In some embodiments, when the composite decorative board 100 has a skin-feel effect, the surface cured film may be a skin-feel film of macromolecule polyester. The glossiness of 60-degrees angle on the surface of the composite decorative board 100 may be 0-10°. The skin-feel film of macromolecule polyester refers to a film that uses polyethylene terephthalate as raw materials to be extruded into thick sheets and then made by bidirectional stretching. The decorative board with the skin-feel film of macromolecule polyester may be widely used for floor decoration and wall decoration. The decorative board with the skin-feel film of macromolecule polyester may have a smooth touching and non-reflective of 180°, thereby achieving an extremely dumb veneer.

In some embodiments, when the composite decorative board 100 has a skin-feel effect, as for 100.9 parts by weight of the primer coating layer and/or the surface coating layer, the components of the primer coating layer and/or the surface coating layer may include 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1-3.0 parts by weight fumed silica.

In some embodiments, a thickness of the surface cured film may be 25-80 micrometers. In some embodiments, the thickness of the surface cured film may be 30-75 micrometers. In some embodiments, the thickness of the surface cured film may be 35-70 micrometers. In some embodiments, the thickness of the surface cured film may be 40-65 micrometers. In some embodiments, the thickness of the surface cured film may be 45-60 micrometers. In some embodiments, the thickness of the surface cured film may be 50-65 micrometers. In some embodiments, the thickness of the surface cured film may be 55-60 micrometers. When the thickness of the surface cured film is within the range, the components of the surface cured film and physical and chemical properties of a paint layer in the UV coating layer 110 may satisfy requirements of the glossiness of the surface of the compositive decorative board 100.

In some embodiments, the forming a UV coating layer by performing a film pressing solidification on a surface cured film disposed on the semi-manufactured board processed by the infrared self-leveling treatment may include forming a medium/high gloss UV coating layer in the air by performing an intermolecular solidification between the surface cured film and the semi-manufactured board processed by the infrared self-leveling treatment using a UV ultraviolet lamp, wherein a polyethylene terephthalate (PET) polyester film is used as the surface cured film. Alternatively, a skin-feeling UV coating layer may be formed under an inert gas by performing an intermolecular automated ordering between the surface cured film and the semi-manufactured board processed by the infrared self-leveling treatment using a UV excimer lamp, wherein a macromolecule polyester skin-feeling film is used as the surface cured film. In some embodiments, an energy range of the UV excimer lamp may be 500-1200 $mj/cm^2$. In some embodiments, the energy range of the UV excimer lamp may be 600-1100 $mj/cm^2$. In some embodiments, the energy range of the UV excimer lamp may be 700-1000 $mj/cm^2$. In some embodiments, the energy range of the UV excimer lamp may be 800-900 $mj/cm^2$. When the energy of the UV excimer lamp is within the range, it may facilitate the intermolecular automated ordering between the macromolecule polyester skin-feeling film and the semi-manufactured board, and prevent a problem of aging due to a too high energy. More descriptions regarding the macromolecule polyester skin-feel film may be found in FIG. 1 and the descriptions thereof, which are not repeated here.

In some embodiments, the inert gas refers to a gas corresponding to all elements in Group 0 of the periodic table of chemical elements. Under normal temperature and pressure, the inert gas may be colorless and odorless monoatomic gases, which may be difficult to carry out chemical reactions. In the manufacturing process or chemical reaction, through the protection of inert gas, the manufacturing process may be carried out in an expected direction and an occurrence of side reactions may be reduced. In some embodiments, the inert gas may be replaced with nitrogen.

In some embodiments, the UV excimer lamp may be understood as a lamp that uses high pressure and high frequency outside the ultraviolet lamp tube to bombard rare gases in the lamp tube to emit ultraviolet light with a single wavelength. Utilizing the single high-intensity ultraviolet light of the UV excimer lamp, it may realize light modification and promote the intermolecular automated ordering between the macromolecule polyester skin-feeling film and the semi-manufactured board.

It should be noted that the above description of the flowchart (FIG. 3) is only for illustration and description, and not intended to limit the scope of the present disclosure. For those skilled in the art, various modifications and variations may be made to the flowchart (FIG. 3) under the guidance of the present disclosure. However, these modifications and variations may still be within the scope of the present disclosure. For example, each operation in operations 310-360 may be independent of each other and executed independently.

The possible beneficial effects according to the embodiments of the present disclosure include but are not limited to the following. (1) By configuring an elastic layer and a rigid layer on the substrate layer, thermal expansion and cold contraction of other layers of the composite decorative board may be effectively matched to ensure that the structure of the entire product is stable, which may effectively improve the warpage, deformation, contraction, and expansion of the composite decorative board. (2) The composite decorative board may have excellent performances of the warpage at room temperature, the thermal warpage, the thermal dimensional change rate, the low-temperature dimensional change rate, the fracture resistance elongation displacement, and the hardness of the elastic layer by adding a plasticizer including epoxy groups into the first structural layer. (3) Through the process of UV coating, the surface of the composite decorative board may have various decorative effects, such as a skin-feel effect, a high-gloss effect, and a medium-gloss effect.

It should be noted that different embodiments may have different beneficial effects. In different embodiments, the possible beneficial effects may be any one or a combination of the above, or any other beneficial effects that may be obtained.

The above content describes the present disclosure and/or some other examples. Based on the above content, the present disclosure may also be modified in different ways. the subject matter disclosed in this the present disclosure may be implemented in different forms and examples, and this the present disclosure may be applied to a large number of the applications. All applications, modifications and changes claimed in the following claims belong to the scope of the present disclosure.

Meanwhile, this specification uses specific words to describe the embodiments of this specification. For example, "one embodiment," "an embodiment," and/or "some embodiments" mean a certain feature, structure, or characteristic related to at least one embodiment of this specification. therefore, it should be emphasized and noted that "one embodiment," or "one embodiment," or "an alternative embodiment," or "another embodiment" mentioned twice or more in different positions in this specification, "example" or "another embodiment" do not necessarily refer to the same embodiment. In addition, some features, structures, or characteristics in one or more embodiments of this specification may be appropriately combined.

In addition, unless explicitly stated in the claims, the order of processing elements and sequences, the use of numbers and letters, or the use of other names described in this specification are not used to limit the order of processes and methods in this specification. Although the foregoing disclosure uses various examples to discuss some invention embodiments that are currently considered useful, it should be understood that such details are only for illustrative purposes, and the appended claims are not limited to the disclosed embodiments. On the contrary, the claims are intended to cover all modifications and equivalent combinations that conform to the essence and scope of the embodiments of this specification. For example, although the implementation of various components described above may be embodied in a hardware device, it may also be implemented as a software only solution, e.g., an installation on an existing server or mobile device.

For the same reason, it should be noted that, in order to simplify the expression disclosed in this specification and help the understanding of one or more embodiments of the invention, in the foregoing description of the embodiments of this specification, multiple features are sometimes combined into one embodiment, drawings or its description. However, this method of disclosure does not mean that the subject of the specification requires more features than those mentioned in the claims. Rather, claimed subject matter may lie in less than all features of a single foregoing disclosed embodiment.

In some embodiments, numbers describing attributes and quantities are used. It should be understood that such numbers used in the description of the embodiments use the modifier "about," "approximately," or "substantially" in some examples. Unless otherwise stated, "about," "approximately," or "substantially" indicates that the number is allowed to vary by ±20%. Correspondingly, in some embodiments, the numerical parameters used in the specification and claims are approximate values, and the approximate values may be changed according to the required characteristics of individual embodiments. In some embodiments, the numerical parameter should consider the prescribed effective digits and adopt the general digit retention method. Although the numerical ranges and parameters used to confirm the breadth of the ranges in some embodiments of this specification are approximate values, in specific embodiments, the setting of such numerical values is as accurate as possible within the feasible range.

For each patent, patent application, patent application publication and other materials cited in the present disclosure, such as articles, books, specifications, publications, documents, objects, etc., the entire contents are hereby incorporated into the present disclosure by reference. Except for the present disclosure history documents that are inconsistent or conflicting with the content of the present disclosure, and the documents that restrict the broadest scope of the claims of the present disclosure (currently or later attached to the present disclosure) are also excluded. It should be noted that if there is any inconsistency or conflict between the description, definition, and/or use of terms in the attached materials of this the present disclosure and the content of this the present disclosure, the description, definition and/or use of terms in this the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, the embodiments of the present the present disclosure are not limited to the embodiments explicitly introduced and described in the present the present disclosure.

What is claimed is:

1. A composite decorative board having a multi-layer structure, the composite decorative board including a substrate layer, and the substrate layer including at least one first structural layer and at least one second structural layer,
wherein the second structural layer is disposed on the first structural layer, the first structural layer being an elastic layer, a component of the first structural layer including a plasticizer, and the second structural layer being a rigid layer, and
as for 323.45 parts by weight of the first structural layer, the first structural layer includes 10-20 parts by weight of the plasticizer, 90-100 parts by weight of polyvinyl chloride, 200-250 parts by weight of calcium carbonate, 0.1-0.3 parts by weight of polyethylene wax, 2-4 parts by weight of a stabilizer, and 0.1-0.4 parts by weight of at least one colorant.

2. The composite decorative board of claim 1, wherein the plasticizer includes epoxy groups.

3. The composite decorative board of claim 2, wherein the plasticizer includes at least one of epoxy linseed oil or epoxy soybean oil.

4. The composite decorative board of claim 1, wherein a thickness of the first structural layer is 1.0-1.5 millimeters.

5. The composite decorative board of claim 1, wherein the second structural layer includes 90-110 parts by weight of polyvinyl chloride, 300-400 parts by weight of calcium carbonate, 1.0-1.6 parts by weight of polyethylene wax, 5-7 parts by weight of a stabilizer, 1.1-1.7 parts by weight of stearic acid, and 5-7 parts by weight of a forming agent of acrylate resin coordinating a metal ion.

6. The composite decorative board of claim 5, wherein the second structural layer includes 100 parts by weight of the polyvinyl chloride, 350 parts by weight of the calcium carbonate, 1.3 parts by weight of the polyethylene wax, 6 parts by weight of the stabilizer, 1.4 parts by weight of the stearic acid, and 6 parts by weight of the forming agent of the acrylate resin coordinating the metal ion.

7. The composite decorative board of claim 1, wherein a thickness of the second structural layer is 3.0-6.5 millimeters.

8. The composite decorative board of claim 1, further including an ultraviolet (UV) coating layer disposed on the second structural layer, wherein the UV coating layer at least includes one of a prime coating layer and a surface coating layer.

9. The composite decorative board of claim 8, wherein the prime coating layer has a mass per unit area of 10-15 g/m$^2$, and the surface coating layer has a mass per unit area of 60-70 g/m$^2$.

10. The composite decorative board of claim 9, wherein the prime coating layer includes 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1.0-3.0 parts by weight of fumed silica.

11. The composite decorative board of claim 9, wherein the surface coating layer includes 25-50 parts by weight of hyperbranched polyester polyfunctional acrylic resin, 20-30 parts by weight of modified epoxy acrylic resin, 30-40 parts by weight of hydroxyethyl methacrylate, 0.8-2.0 parts by weight of 1-hydroxycyclohexane phenyl ketone, and 1.0-3.0 parts by weight of fumed silica.

* * * * *